(12) United States Patent
Hassan Hussein et al.

(10) Patent No.: US 11,411,637 B2
(45) Date of Patent: Aug. 9, 2022

(54) SYSTEM FOR NON-TERRESTRIAL COMMUNICATIONS

(71) Applicant: Fraunhofer-Gesellschaft zur Foerderung der angewandten Forschung e.V., Munich (DE)

(72) Inventors: Khaled Shawky Hassan Hussein, Erlangen (DE); Christian Rohde, Erlangen (DE); Thomas Heyn, Erlangen (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 16/833,124

(22) Filed: Mar. 27, 2020

(65) Prior Publication Data

US 2020/0228194 A1 Jul. 16, 2020

Related U.S. Application Data

(63) Continuation of application No. PCT/EP2017/077320, filed on Oct. 25, 2017.

(30) Foreign Application Priority Data

Sep. 29, 2017 (EP) .................... 17194242

(51) Int. Cl.
*H04B 7/185* (2006.01)
*H04L 1/18* (2006.01)

(52) U.S. Cl.
CPC ..... *H04B 7/18513* (2013.01); *H04B 7/18526* (2013.01); *H04L 1/1816* (2013.01); *H04L 1/1819* (2013.01); *H04L 1/1822* (2013.01)

(58) Field of Classification Search
CPC ... H04L 1/1816; H04L 1/1819; H04L 1/1822; H04L 1/1657; H04L 1/1635;
(Continued)

(56) References Cited

U.S. PATENT DOCUMENTS

2010/0099352 A1 4/2010 Lee et al.
2011/0305213 A1 12/2011 Loehr et al.
(Continued)

FOREIGN PATENT DOCUMENTS

CN 103532683 A 1/2014
EP 2159976 A1 3/2010
(Continued)

OTHER PUBLICATIONS

3GPP TS 36.211, "Physical channels and modulation", version 14.2.0 Release 14, Apr. 2017, 80 pp. Uploaded in 3 parts.
(Continued)

*Primary Examiner* — Phong La
(74) *Attorney, Agent, or Firm* — Perkins Coie LLP; Michael A. Glenn

(57) ABSTRACT

System including a gateway, a non-terrestrial node, a terrestrial node and at least a user equipment and a HARQ controller, the gateway being configured to forward a data packet, the data packet to be transmitted to the user equipment, to the non-terrestrial node, the non-terrestrial node being configured to forward the received data packet to the user equipment using a signal, the user equipment being configured to analyze the received data packet regarding a transmission error and/or to analyze the signal from the non-terrestrial node regarding a signal quality and to generate a negative acknowledgment command or an acknowledgement command dependent on the transmission error or to generate another signal indicating the reception signal quality dependent on the reception signal quality, the user (Continued)

equipment being configured to transmit the acknowledgement command and the non-acknowledgement command or the other signal to the terrestrial node communicating with the non-terrestrial node.

21 Claims, 8 Drawing Sheets

(58) Field of Classification Search
CPC .......... H04B 7/18513; H04B 7/18515; H04B 7/18521; H04B 7/18523; H04B 7/1851; H04B 7/18526; H04B 7/18576; H04B 7/18508; H04B 7/185; H04B 7/18502
See application file for complete search history.

(56) References Cited

U.S. PATENT DOCUMENTS

| | | | |
|---|---|---|---|
| 2012/0144433 A1 | 6/2012 | Won et al. | |
| 2014/0171082 A1 | 6/2014 | Smadi et al. | |
| 2014/0241254 A1 | 8/2014 | Kaur et al. | |
| 2016/0174246 A1* | 6/2016 | Uchino | H04W 72/12 370/326 |
| 2017/0041830 A1* | 2/2017 | Davis | H04B 7/18521 |
| 2017/0208583 A1* | 7/2017 | Jiang | H04L 5/1469 |
| 2017/0222713 A1 | 8/2017 | Damnjanovic et al. | |
| 2017/0331577 A1* | 11/2017 | Parkvall | H04J 11/0079 |
| 2018/0026708 A1* | 1/2018 | Priest | H04W 4/40 370/316 |
| 2018/0047295 A1* | 2/2018 | Ricci | G05D 1/104 |
| 2018/0083694 A1* | 3/2018 | Rajagopalan | H04L 1/1816 |
| 2018/0205431 A1* | 7/2018 | Nammi | H04B 7/0413 |
| 2019/0090141 A1* | 3/2019 | Fujii | H04W 84/06 |
| 2019/0274164 A1* | 9/2019 | Zhang | H04W 74/0808 |
| 2019/0289555 A1* | 9/2019 | Zhang | H04W 52/14 |
| 2019/0306768 A1* | 10/2019 | Kim | H04B 17/382 |

FOREIGN PATENT DOCUMENTS

| | | |
|---|---|---|
| JP | H01209830 A | 8/1989 |
| JP | 2007258976 A | 10/2007 |
| JP | 2012516593 A | 7/2012 |
| JP | 2015233351 A | 12/2015 |
| JP | 2019511144 A | 4/2019 |

OTHER PUBLICATIONS

3GPP TS 36.212, "Multiplexing and channel coding", version 14.2.0 Release 14, Apr. 2017, 83 pp. Uploaded in 3 parts.
3GPP TS 36.213, "Physical layer procedures Under change control", version 14.2.0 Release 14, Apr. 2017, 85 pp. Uploaded in 6 parts.
Aguirre, Miguel A, "Introduction to Space Systems Design and Synthesis", Space Technology Library, Springer, 2013 only abstract available, 2013.
Guidotti, A, et al., "Satellite-enabled LTE systems in LEO constellations", 2017 IEEE International Conference on Communications Workshops (ICC Workshops), IEEE, (May 21, 2017), doi:10.1109/ICCW.2017.7962769, XP033111607; DOI: http://dx.doi.org/10.1109/ICCW.2017.7962769, pp. 876-881.
Ravanshid, Azad, et al., "Multi-connectivity functional architectures in 5G", 2016 IEEE International Conference on Communications Workshops (ICC), Kuala Lumpur, 2016, pp. 187-192, XP032919911 DOI: http://dx.doi.org/10.1109/ICCW.2016.7503786, pp. 187-192.
Research in Motion UK Limited, "Performance Analysis and DL/UL Transmission Schemes for Type-ll Relay", 3GPP Draft; R1-094466(RIM-Performance Analysis TYPE2_TXRX), 3RD Generation Partnership Project (3GPP), Mobile Competence Centre; 650, Route Des Lucioles; F-06921 Sophia-Antipolis CEDEX; France, (Nov. 3, 2009), XP050597825, Nov. 3, 2009, 12 pp.
Rohde & Schwarz, "LTE—Advanced (3GPP Rel.11) Technology Introduction", White Paper, 2013, 2013, 39 pp.
Thales, et al., "Non-Terrestrial Networks: Considerations on NR impacts", vol. RAN WG1, No. Prague, Czech Republic; (Aug. 20, 2017), 3GPP Draft; R1-1714477_NR Impacts, 3GPP, Mobile Competence Centre; URL: http://www.3gpp.org/ftp/Meetings_3GPP_SYNC/RAN1/Docs/, XP051317254, Aug. 20, 2017, 12 pp.
"3GPP TR 38.811 VO.2.0 (Sep. 2017)", 3rd Generation Partnership Project; Technical Specification Group Radio Access Network; Study on New Radio (NR) to support Non Terrestrial Networks (Release 15), Sep. 26, 2017, 18.
"Fraunhofer IIS, Fraunhofer HHi", [Uploaded in 4 parts] Fraunhofer IIS, Fraunhofer HHi, NTN NR impacts on the HARQ Operation, 3GPP TSG RAN Plenary Meeting RAN#78, RP-172392, Dec. 11, 2017, Dec. 11, 2017, p. 1.
Itu, "Detailed specifications of the satellite radio interfaces of International Mobile Telecommunications-Advanced", (IMT-Advanced), Recommendation ITU-R M.2047-0, <URL> https://www.itu.int/dms_pubrec/itu-r/rec/m/R-REC-M.2047-0-201312-I!!PDF-E.pdf, Dec. 31, 2013.

* cited by examiner

SYSTEM FOR NON-TERRESTRIAL COMMUNICATIONS

CROSS-REFERENCES TO RELATED PUBLICATIONS

This application is a continuation of copending International Application No. PCT/EP2017/077320, filed Oct. 25, 2017, which is incorporated herein by reference in its entirety, and additionally claims priority from European Application No. 17194242.8, filed Sep. 29, 2017, which is incorporated herein by reference in its entirety.

Embodiments of the present invention refer to a user equipment, a base station, a satellite or a gateway of a system comprising said entities. Embodiments refer to routed acknowledgements at real-time buffering transmission for fast non-terrestrial communications.

BACKGROUND OF THE INVENTION

One of the main requirements for 5G is to improve the link reliability and quality-of-service. For this reason, hybrid automatic repeat request (hybrid ARQ or HARQ) is an important process to maintain reliable communication and to guarantee the most possible error correction and decoding capabilities. However, HARQ itself is a complicated process that needs to compute different redundancy versions of an initial transmission.

Once the transmitter node (base-station or a mobile station) receives a negative acknowledgement (NACK), it will automatically retransmit a new version of the previously transmitted transport block (TB) composed of different arrangements of redundancy bits and data bits.

The plurality of HARQ or ARQ approaches have been discussed within known technology: HARQ process and ARQ process is covered in [LTE-36212] [LTE-36211], dual connectivity and multi-connectivity is part of literature [CD-MC], buffer for satellite broadcast is part of literature [Relay], donor base station and remote base station is part of literature [Rel11], resource allocation resource grating in time and frequency is the state of the ART. [LTE36213].

A critical feature of the HARQ process is that it has a critical timely manner. This means that if acknowledgement (ACK) is not received within a given window, the transmitted might be forced to (unnecessarily) send retransmission again. This will be very critical in satellite communication where the round-trip-time (RTT) already exceeds the maximum possible time window size. Even more difficult will be compensating this RTT delay, which will result in 4 to 15 times more parallel HARQ process compared to normal terrestrial communication; this might be practically infeasible.

Another problem in the HARQ process is that it keeps the uplink channel of the ground mobile set/user equipment (UE) busy with allocating resources in the satellite links in the backward direction. This will cause an inefficient and power-hungry process. Therefore, there is a need for an improved approach.

SUMMARY

An embodiment may have a user equipment of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the user equipment including a transceiver which includes: a non-terrestrial signal receiver configured to receive the data packet from the non-terrestrial node; a unit for analyzing the signal quality of the data packet, said unit being configured to generate the acknowledgement command in case of a sufficiently correct reception of the data packet or to generate the non-acknowledgement command in case of an incorrect reception of the data packet; and a terrestrial signal transmitter configured to transmit the acknowledgement command and or the non-acknowledgement command to the terrestrial node in order to initiate using the non-acknowledgement command a retransmission of the data packet and/or a redundancy version of the data packet.

Another embodiment may have a method for operating a user equipment of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method including the following steps: receiving a data packet using a non-terrestrial signal receiver; analyzing the signal quality of the data packet and generating the acknowledgment command in case of a sufficiently correct reception of the data packet or generating a non-acknowledgement command in case of an incorrect reception of the data packet; and transmitting the acknowledgment command or the non-acknowledgment command to the terrestrial node using a terrestrial signal transmitter in order to initiate using the non-acknowledgment command a retransmission of the data packet or a retransmission of a redundancy version of the data packet.

Another embodiment may have a terrestrial node of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the terrestrial node, the terrestrial node including: a non-terrestrial signal receiver configured to receive the data packet or a redundancy version of the data packet from the non-terrestrial node; a memory configured to buffer the data packet or the redundancy version of the data packet; a terrestrial signal receiver configured to receive the acknowledgement command or the non-acknowledgement command from the user equipment; and a terrestrial signal transmitter configured to retransmit the data packet or a redundancy version of the data packet to the user equipment as response to the non-acknowledgment command.

Another embodiment may have a method for operating a terrestrial node a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps: receiving the data packet or a redundancy version of the data packet from the non-terrestrial node using a non-terrestrial signal receiver; buffering the data packet or the redundancy version of the data packet using a memory; receiving the acknowledgment command and/or the non-acknowledgment command from the user equipment using the terrestrial signal receiver; and retransmitting the buffered data packet or the buffered redundancy version of the data packet to the user equipment using a terrestrial transceiver as response to the non-acknowledgment command.

Another embodiment may have a satellite of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the satellite includes a transceiver including: one or more transmitters, wherein the one or more transmitters are configured to transmit the data packet to the user equipment and to transmit the data packet or a redundancy version of the data packet to the terrestrial node.

Another embodiment may have a method operating a satellite of system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method including the steps: transmitting the data packet to the user equipment; and transmitting the data packet or a redundancy version of the data packet to the terrestrial node.

Another embodiment may have a satellite of a system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the satellite includes a memory which is configured to buffer the data packet to be sent to the user equipment and/or a redundancy version of the data packet.

Another embodiment may have a method for operating a satellite or system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps: buffering the data packet or a redundancy version of the data packet by a memory of the satellite; and/or forwarding the data packet or the redundancy version of the data packet to a terrestrial node, such that the terrestrial node buffers the data packet or the redundancy version of the data packet.

Another embodiment may have a HARQ controller of a system, the system including a gateway, a non-terrestrial node, a terrestrial node and at least a user equipment wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the HARQ controller is configured to control the buffering performed a memory of the satellite and/or by a memory of the terrestrial node.

Another embodiment may have a gateway of a system, the system including at least a ARQ controller according to one of the claims 28-31, the gateway including a further HARQ controller and/or an ARQ controller; or wherein the gateway includes an ARQ controller receiving acknowledgement command and the non-acknowledgement command relayed back to the satellite by the terrestrial node in order to satisfy the automatic repeat request ARQ of upper layers.

Another embodiment may have a method for operating a HARQ controller of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, wherein the method includes the steps: buffering the data packet or a redundancy version of the data packet to a memory of the satellite; and/or buffering the data packet or the redundancy version of the data packet to a memory of the terrestrial node.

Another embodiment may have a system, the system including a gateway, a non-terrestrial node, a terrestrial node and at least a user equipment, wherein terrestrial node includes s a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node.

Another embodiment may have a non-transitory digital storage medium having a computer program stored thereon to perform the method for operating a user equipment of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method including the following steps: receiving a data packet using a non-terrestrial signal receiver; analyzing the signal quality of the data packet and generating the acknowledgment command in case of a sufficiently correct reception of the data packet or generating a non-acknowledgement command in case of an incorrect reception of the data packet; and transmitting the acknowledgment command or the non-acknowledgment command to the terrestrial node using a terrestrial signal transmitter in order to initiate using the non-acknowledgment command a retransmission of the data packet or a retransmission of a redundancy version of the data packet, when said computer program is run by a computer.

Another embodiment may have a non-transitory digital storage medium having a computer program stored thereon to perform the method for operating a terrestrial node a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps: receiving the data packet or a redundancy version of the data packet from the non-terrestrial node using a non-terrestrial signal receiver; buffering the data packet or the redundancy version of the data packet using a memory; receiving the acknowledgment command and/or the non-acknowledgment command from the user equipment using the terrestrial signal receiver; and retransmitting the buffered data packet or the buffered redundancy version of the data packet to the user equipment using a terrestrial transceiver as response to the non-acknowledgment command, when said computer program is run by a computer.

Another embodiment may have a non-transitory digital storage medium having a computer program stored thereon to perform the method operating a satellite of system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method including the steps: transmitting the data packet to the user equipment; and transmitting the data packet or a redundancy version of the data packet to the terrestrial node, when said computer program is run by a computer.

Another embodiment may have a non-transitory digital storage medium having a computer program stored thereon to perform the method for operating a satellite or system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps: buffering the data packet or a redundancy version of the data packet by a memory of the satellite; and/or forwarding the data packet or the redundancy version of the data packet to a terrestrial node, such that the terrestrial node buffers the data packet or the redundancy version of the data packet, when said computer program is run by a computer.

Another embodiment may have a non-transitory digital storage medium having a computer program stored thereon to perform the method for operating a HARQ controller of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, wherein the method includes the steps: buffering the data packet or a redundancy version of the data packet to a memory of the satellite; and/or buffering the data packet or the redundancy version of the data packet to a memory of the terrestrial node, when said computer program is run by a computer.

Another embodiment may have a terrestrial node of a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment via a non-terrestrial channel, wherein the user equipment is configured to analyze a channel quality of the non-terrestrial channel and to transmit an information regarding the channel quality of the non-terrestrial channel to the base station, the terrestrial node including: a non-terrestrial signal receiver configured to receive the data packet or a redundancy version of the data packet from the non-terrestrial node; a memory configured to buffer the data packet or the redundancy version of the data packet; a terrestrial signal receiver configured to receive the information regarding the channel quality of the non-terrestrial channel from the user equipment; and a terrestrial signal transmitter configured to retransmit the data packet or a redundancy version of the data packet to the user equipment as response to a channel quality of the non-terrestrial channel below a threshold.

Another embodiment may have a method for operating a terrestrial node a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment via a non-terrestrial channel, wherein the user equipment is configured to analyze a channel quality of the non-terrestrial channel and to transmit an information regarding the channel quality of the non-terrestrial channel to the base station, the method includes the following steps: receiving the data packet or a redundancy version of the data packet from the non-terrestrial node using a non-terrestrial signal receiver; buffering the data packet or the redundancy version of the data packet using a memory; receiving the information regarding the channel quality of the non-terrestrial channel from the user equipment using the terrestrial signal receiver; and retransmitting the buffer data packet or the buffered redundancy version of the data packet to the user equipment using a terrestrial transceiver as response to a channel quality of the non-terrestrial channel below a threshold.

Another embodiment may have a terrestrial node of a system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the terrestrial node including: a terrestrial signal receiver configured to receive another data packet from the user equipment, the other data packet is to be transmitted to the gateway; a unit for analyzing the signal quality of the other data packet, said unit being configured to generate an acknowledgement command in case of a sufficiently correct reception of the data packet or to generate an non-acknowledgement command in case of an incorrect reception of the data packet; and a terrestrial signal transmitter configured to transmit the acknowledgement command or the non-acknowledgement command to the user equipment in order to initiate using the non-acknowledgement command a retransmission of the other data packet and/or a redundancy version of the other data packet, wherein parallel resources are used for the retransmission; further including a controller configured to choose or adapt the modulation and coding scheme in accordance to the communication requirements of the transmission between the user equipment and the terrestrial node and in accordance to the communication requirements of the transmission between the terrestrial node and the non-terrestrial node.

Another embodiment may have a method for operating a terrestrial node a system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps:

receiving another data packet from the user equipment using a non-terrestrial signal receiver, the other data packet is to be transmitted to the gateway; analyzing the signal quality of the other data packet and generating an acknowledgement command in case of a sufficiently correct reception of the data packet or generating an non-acknowledgement command in case of an incorrect reception of the data packet; transmitting the acknowledgement command or the non-acknowledgement command to the user equipment using a terrestrial signal transmitter to in order to initiate using the non-acknowledgement command a retransmission of the other data packet and/or a redundancy version of the other data packet, wherein parallel resources are used for the retransmission; and choosing or adapting the modulation and coding scheme in accordance to the communication requirements of the transmission between the user equipment and the terrestrial node and in accordance to the communication requirements of the transmission between the terrestrial node and the non-terrestrial node.

Another embodiment may have a non-transitory digital storage medium having a computer program stored thereon to perform the method for operating a terrestrial node a system, the system including a gateway, a non-terrestrial node, a terrestrial node and at least a user equipment, wherein terrestrial node includes a HARQ controller, wherein the gateway is configured to forward a data packet, said data packet to be transmitted to the user equipment, to the non-terrestrial node, wherein the non-terrestrial node is configured to forward the received data packet to the user equipment via a non-terrestrial channel, wherein the user equipment is configured to analyze a channel quality of the non-terrestrial channel and to transmit an information regarding the channel quality of the non-terrestrial channel to the base station, the method includes the following steps: receiving the data packet or a redundancy version of the data packet from the non-terrestrial node using a non-terrestrial signal receiver; buffering the data packet or the redundancy version of the data packet using a memory; receiving the information regarding the channel quality of the non-terrestrial channel from the user equipment using the terrestrial signal receiver; and retransmitting the buffer data packet or the buffered redundancy version of the data packet to the user equipment using a terrestrial transceiver as response to a channel quality of the non-terrestrial channel below a threshold, when said computer program is run by a computer.

Another embodiment may have a non-transitory digital storage medium having a computer program stored thereon to perform the method for operating a terrestrial node a system, the system including a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error and/or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method includes the following steps: receiving another data packet from the user equipment using a non-terrestrial signal receiver, the other data packet is to be transmitted to the gateway; analyzing the signal quality of the other data packet and generating an acknowledgement command in case of a sufficiently correct reception of the data packet or generating an non-acknowledgement command in case of an incorrect reception of the data packet; transmitting the acknowledgement command or the non-acknowledgement command to the user equipment using a terrestrial signal transmitter to in order to initiate using the non-acknowledgement command a retransmission of the other data packet and/or a redundancy version of the other data packet, wherein parallel resources are used for the retransmission; and choosing or adapting the modulation and coding scheme in accordance to the communication requirements of the transmission between the user equipment and the terrestrial node and in accordance to the communication requirements of the transmission between the terrestrial node and the non-terrestrial node, when said computer program is run by a computer.

The invention is based on the general concept of a system which comprises a gateway, a non-terrestrial node or entity, like a satellite or high altitude platform, a terrestrial node, especially a terrestrial base station, and at least a user equipment. Furthermore, the system comprises a HARQ controller and the gateway. The gateway is configured to forward at least a data packet which should be transmitted to the user equipment, to the non-terrestrial node, such that the non-terrestrial node can forward the at least one received data packet to the user equipment. The user equipment is configured to analyze the received data packet with regard to a transmission error and/or to analyze the signal from the non-terrestrial node (10) with regard to a signal quality and to generate a negative acknowledgement command or an acknowledgement command dependent on the transmission error or to generate another signal indicating the reception signal quality dependent on the reception signal quality of the at least one received data packet. The user equipment is further configured to transmit the acknowledgement command and/or the non-acknowledgement command or the other signal to the terrestrial node which communicates with the non-terrestrial node.

Embodiments assume a scenario where the user-equipment/UE-to-Network-Relay/mobile-station is connected to (5G) Satellite mobile services while keeping a terrestrial connection doubly (multiply) connected to it. Here, a first aspect refers to the user equipment of the system. The user system comprises a transceiver comprising a non-terrestrial signal receiver, means for analyzing the signal quality of the at least one data packet and a terrestrial signal transmitter. The non-terrestrial signal receiver is configured to receive the at least one data packet from the non-terrestrial node. The at least one data packet is analyzed with regard to the signal quality, i.e. to determine a transmission error by the means for analyzing the signal quality of the at least one data packet, wherein said means are configured to generate the acknowledgement command in case of a sufficiently correct reception of the at least one data packet and/or to generate the non-acknowledgement command in case of an incorrect reception. This acknowledgement command or this non-acknowledgement command is transmitted using the terrestrial signal transmitter, to the terrestrial node in order to initiate using the non-acknowledgement command, a retransmission of the data packet or a redundancy version of the data packet which, for example, may be stored by the terrestrial node. According to a further embodiment, the transceiver of the user equipment comprises a terrestrial signal receiver for receiving the retransmitted data packet or the retransmitted redundancy version of the data packet from the terrestrial node. The uplink of the user equipment may also be realized via the terrestrial node, so that the user equipment comprises a terrestrial signal transmitter to transmit another data packet to be transmitted to the gateway. Vice-versa, where a terrestrial node as well as the satellite are configured to forward another data packet according to further embodiments.

Another aspect refers to a terrestrial node of the system. The base station comprises a non-terrestrial signal receiver, a terrestrial signal receiver, a terrestrial signal transmitter as well as a memory. The non-terrestrial signal receiver is configured to receive a data packet (to retransmit it to the user equipment) or a redundancy version thereof from the satellite of the High Altitude Platform. This data packet or the redundancy version thereof is buffered using the memory. The terrestrial signal receiver serves the purpose to receive the acknowledgement/non-acknowledgement command from the user equipment. The terrestrial signal transmitter is configured to transmit the at least one data packet or redundancy version thereof to the user equipment as a response to the non-acknowledgement command.

According to embodiments, the terrestrial node is configured to listen to the satellite in order to receive the data packet sent to the user equipment. According to another embodiment, the terrestrial node receives the at least one data packet or redundancy version thereof via a separate channel from the non-terrestrial node. According to embodiments, the base station may compress the decoder for performing the decoding of the received data packet received by the non-terrestrial signal receiver in order to generate a redundancy version of the data packet. For example, the decoder may decode and generate the redundancy version for each data packet received by the non-terrestrial signal receiver or perform the decoding and generating on request. According to further embodiments, the decoding may not be performed or suppressed when an information from the user equipment is available, that the received quality is ideal. According to another embodiment, the decoder may just perform the decoding, when the user equipment is assigned with the terrestrial node, and to suppress the decoding, in case a user equipment is not associated with the terrestrial node. The purpose for this is security reasons, such that the buffering of the respective data packets is just performed by the base station/satellite next to the corresponding user equipment.

Another aspect refers to the satellite of the system. Here, the satellite is typically configured to transmit the at least one data packet to the user equipment and in parallel to the base station. Vice-versa, the satellite may be configured to forward the received another data packet to the gateway. According to an embodiment, the satellite may be configured to transmit the at least one data packet to the user equipment and to transmit the at least one data packet or a redundancy version of the data packet to the terrestrial node using a dedicated wideband channel. Here, it is typical, that the HARQ controllers integrated into the gateway controls the transmitter or transmitters of the satellite. The controlling can be performed, in that way, that the gateway assigns different resources for transmitting the at least one data packet to the user equipment and for transmitting the at least one data packet or the redundancy version thereof to the terrestrial node.

Another embodiment assesses the synchronization to a non-terrestrial node, together with a one or more terrestrial Base-station, Buffer or Relay/UE-to-Network-Relay. Here, according to an embodiment, the satellite may comprise a memory for buffering the at least one data packet to be sent to the user equipment or a redundancy version thereof. Here, different buffering strategies may be applied, e.g., if the satellite as well as the terrestrial node comprise buffers. For example, some data packets to be transmitted to the user equipment may be forwarded to the terrestrial node in order to buffer same. For example, different redundancy versions of the at least one data packet (or additional data packets) may be distributed alternating to the memories of the satellite and the terrestrial node. This approach enables to distribute the retransmission balance. According to another approach, the buffering is performed, such that the first redundancy versions are buffered by the memory of the terrestrial node, such that the user equipment has fast access to same, while the last redundancy versions are buffered by the memory of the satellite. Here, the buffering is controlled by the HARQ controller, which may be part of the gateway. According to further embodiments, the buffering is performed based on the satellite downlink congestion level.

Another aspect refers to a terrestrial node comprising a non-terrestrial signal receiver, a memory, a terrestrial signal receiver and a terrestrial signal transmitter. The non-terrestrial signal receiver is configured to receive the data packet or a redundancy version of the data packet from the non-terrestrial node. The memory buffers the data packet or the redundancy version of the data packet. The terrestrial signal receiver receives the information regarding the channel quality of the non-terrestrial channel from the user equipment, wherein the terrestrial signal transmitter retransmits the data packet or a redundancy version of the data packet to the user equipment as response to a channel quality of the non-terrestrial channel below a threshold.

Another aspect refers to terrestrial node comprising a non-terrestrial signal receiver, means for analyzing the signal quality and a terrestrial signal transmitter. The non-terrestrial signal receiver is configured to receive another data packet from the user equipment, the other data packet is to be transmitted to the gateway. The means for analyzing the signal quality of the other data packet are configured to generate an acknowledgement command in case of a sufficiently correct reception of the data packet or to generate an non-acknowledgement command in case of an incorrect reception of the data packet. The terrestrial signal transmitter transmits the acknowledgement command or the non-acknowledgement command to the user equipment in order to initiate using the non-acknowledgement command a retransmission of the other data packet and/or a redundancy version of the other data packet. Here, parallel resources are used for the retransmission. This enables that the forwarding the UL may be continued without interruption although there are some failed frames within the transmission.

All the above aspects are based on the general idea of using satellite connections together with terrestrial networks for a purpose of offloading busy ground base stations and/or covering weak and heavily faded cells. For this reason, the satellite links to the user equipment can be best utilized for downlink (forward) transmission. The uplink channel (during feedback of acknowledgements, channels data information or low traffic uplink data) can be rerouted to the newest possible base station or a network-connected relaying node. The above embodiments minimize the HARQ process timing, delays (including system and frame delivery latency), and overhead over the satellite channel. This is done by utilizing dual-connectivity (DC)/multi-connectivity (MC) with a ground station. Embodiments also offloads the DL traffic from terrestrial to the non-terrestrial network allowing minimum feedback and HARQ mechanism timing.

Although, the above embodiments/aspects have been discussed in context of different entities of the system which is used, it should be noted that further embodiments refer to the corresponding operation methods for operating the user equipment, for operating the terrestrial node, for operating the satellite or for operating the HARQ controller. According to another embodiment the method may be performed using a computer program running on a computer.

Another embodiment provides a system comprising the above-discussed entities.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
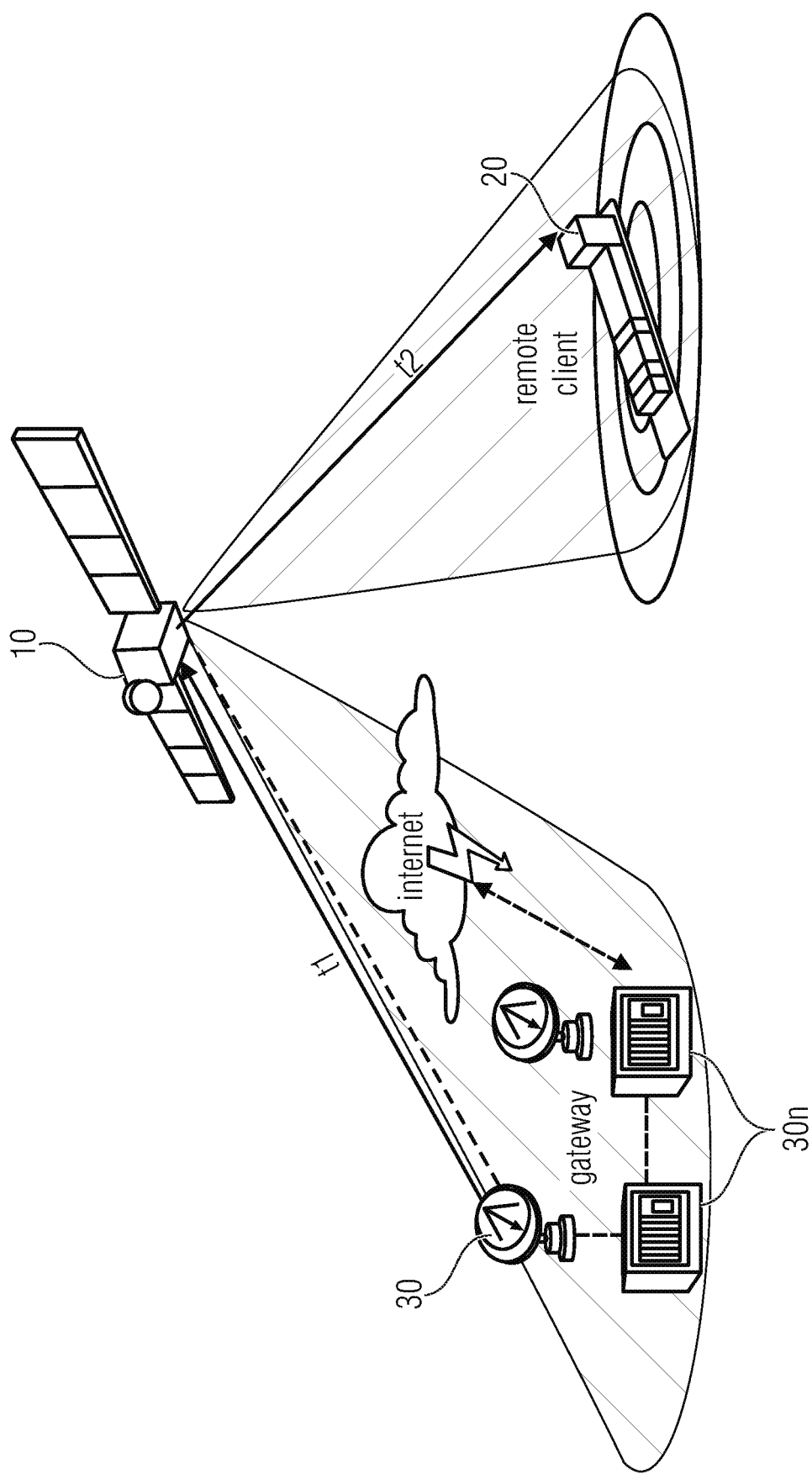
FIG. 1 shows a schematic representation for illustrating the principle of a bent pipe architecture.

Below, embodiments of the present invention will subsequently be discussed referring to the enclosed figures, wherein identical reference numerals are provided to elements or objects having identical or similar functions, so that the description thereof is mutually applicable or interchangeable.

FIG. 1 shows a satellite 10 (non-terrestrial node) connecting a remote client 20 with the gateway 30. The gateway 30 which is connected to the cellular/mobile core network (CN) and/or connected to a donor base-station, communicates with the satellite 10 using the communication link t1, e.g. via a dedicated wideband channel, i.e., transmitting both downlink (DL) and uplink (UL) data. Regarding the term uplink and downlink, it should be noted that both terms describe the transmission situation from the point of view of the user equipment 22. Therefore, the downlink is referred to the transmission of data from the gateway 30 via the satellite 10 to the user equipment, while uplink refers to a transmission from the user equipment 22 to the base station 30 via the entities 40 and 10.

The remote client 20, which may be arranged on a vessel, communicates with the satellite using the communication link t2. The user registration information and the users radio resource controller is handled via (or through) the donor BS. From another point of view, the arrangement comprising the three entities 10, 20 and 30 may be described as bent pipe satellite 10 with a gateway 30 connected to it and the satellite 30 linking the network gateway 30 and (to the internet) to a remote unit 20. In detail, the Satellite/HAP 10 transmits forward the signal to the ground nodes using the donor BS/Gateway grant proposals (when bent-pipe Satellite is used, the donor BS proposes grants (resource allocation)) or by assigning different resources on the used frequency (when the Satellite/HAP has MAC capabilities). Note a grant means that the resource allocation in time and frequency granted for users based on their request, i.e., scheduling request. The remote client 20 may be a type of relay, such that a user equipment (not shown) can connect to the remote client 20. Alternatively, the user equipment may directly communicate with a satellite 10.

According to a conventional approach, the typically used ARQ or HARQ controller together with its buffer memories may be integrated into the gateway 30 or an entity beside the gateway 30, e.g. the entity marked by the reference numeral 30n. If, for example, a data packet should be transmitted from the internet via the gateways 30n and 30, so that the satellite 10, the remote client 20 to the user equipment, the corresponding data packet is forwarded a plurality of times. In case of an insufficiently good reception of the data packet, the user equipment typically sends a non-acknowledgement command to the HARQ controller in order to initiate a retransmission of the broken data packet. This non-acknowledgement command is also forwarded by said entities so that the data packet of a redundancy version of the data packet can be retransmitted via the same way to the user equipment. All these transmission procedures take time, so that the error handling may have a potential to be optimized. This optimized approach will be discussed with respect to FIG. 2.

Figure 2:
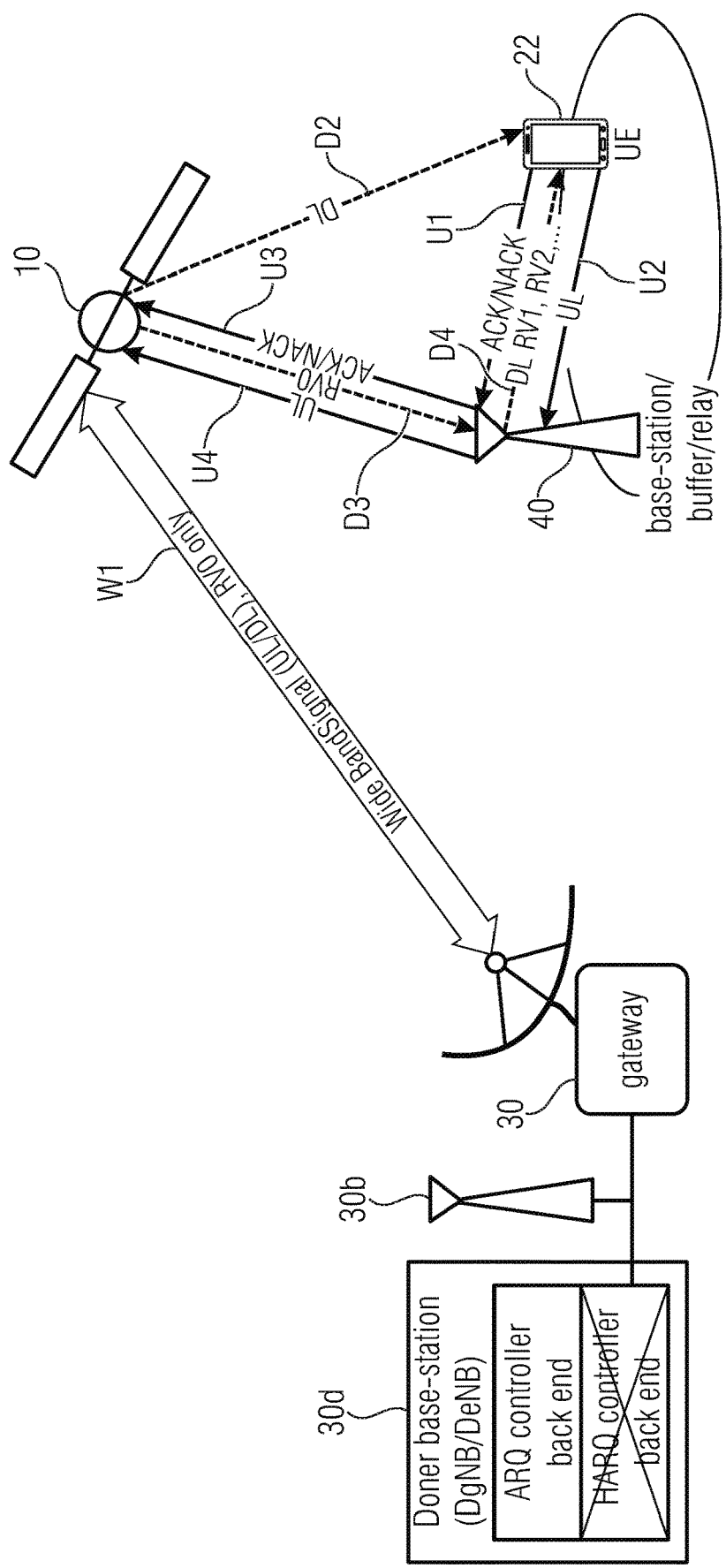
FIG. 2 shows a schematic representation of a configuration comprising a base station, a user equipment, a satellite and a gateway, wherein the HARQ controller is implemented at the base station according to embodiments.

Before discussing the embodiment of FIG. 2, it should be noted that the usage of a satellite 10, like a GEO-satellite having an altitude of 36 km or a LEO-satellite having an altitude of 2 km are just exemplarily. According to another embodiment, a so-called High Altitude Platform (HAP) may be used, since same enables a comparable functionality than a bent pipe satellite 10, so that a communication linking by use of a High Altitude Platform may suffer under the same throwbacks than present by using a bent pipe satellite 10. In general, the satellite or high altitude platform is referred to as non-terrestrial node.

Furthermore, it should be noted that the terrestrial base station/buffer/relay may be realized implanted into a user equipment (smart phone) or another entity being arranged on the ground, i.e. a terrestrial entity. Therefore—as general term—terrestrial node may be used for the base station 40.

FIG. 2 shows a configuration having the gateway 30, the satellite 10, for establishing a communication to a user equipment 22. Within the surrounding of the user equipment 22 a base station 40 (terrestrial node) may be arranged. The base station 40 is connected to the satellite 10, too.

The gateway 30 may be integrated into a mobile telecommunication network, i.e. connected with another base station 30b or a donor base station 30d. The gateway 30 serves the purpose to connect the mobile communication network (cf. donor base station 30d) with the satellite. The connection is responsible for the uplink as well as for the downlink. For example, a wideband signal W1 may be used. Regarding the donor base station 30d, it should be noted that the donor base station typically comprises the ARQ controller (back end/upper layer ARQ) as well as the HARQ controller (back end), wherein in this embodiment, the HARQ controller is relocated from the donor base station 30d to the base station 40.

The bent-pipe satellite or the satellite 10 may comprise a lite/light/simplified base-band processing capabilities or a satellite with full processing capabilities. The satellite (when bent-pipe is used) acts as a Relay to the ground network node 40. This ground node/base station 40 can be on any form of UE, UE-Relay-to-Network, the buffer, or a remote BS. When the Satellite/HAP 10 has better capabilities, more processing and algorithms shall be executed.

The base station 40 which may comprise a HARQ controller (front end) may be realized as a conventional base station in the surrounding of the user equipment 22 or as a simple relay. According to embodiments, the base station 40 comprises a buffer (memory). Since the substantial structure of the communication network comprising the donor base station 30d, the satellite gateway 30, the satellite 10, the base station 40 and the user equipment 22 has been discussed, the functionality of the system/network and its entities will be discussed, below.

The gateway enables the uplink and the downlink using the wideband signal W1. As illustrated by the error value 1, the data packet RV0 as a data packet to retransmit to the user equipment 22, it is sent to the satellite 10.

The satellite 10 forwards the data packet RV0 to the user equipment 22 (cf. communication link marked by the reference numeral D2). For this, resources may be allocated by the donor base station 30d, as described above. In parallel, the first redundancy version RV0 is generated based on the data packet RV0 by the ARQ controller and transmitted using the wideband signal W1 from the gateway 30 to the satellite 10, such that same can forward the redundancy version RV0 to the base station 40 using the communication link D3. This means, that the downlink for RV0 is covered by the satellite 10, while RV1, RV2, . . . are covered by a dual-connected remote base station. This means, that RV1, RV2, RV3, . . . are regenerated from a correctly received RV0 at the remote base station 40. Alternatively, the first redundancy version RV0 may be generated by the HARQ controller of the base station 40. In this case, the satellite 10 just receives the data packet RV0 and transmits the data packet RV0 to the user equipment 22 and in parallel to the base station 40 using the two communication links D2 and D3. In order to ensure, that the redundancy versions are correctly received by the base station 40, a stable connection, like a DC- or -MC communication may be used. The redundancy versions RV0, RV1, RV2, . . . may be buffered within a memory of the base station 40.

Starting from this configuration, the bellow discussed concept enables buffering or generating the different redundancy versions (RVs) of an initial transmission RV0. The redundancy versions (RV1, RV2, . . . ) are later transmitted from a relay, buffer, or a terrestrial base-station 22 with satellite connection. More or different redundancy versions can also be transmitted via satellite on different or similar time slots. This optimized HARQ process enables allowing latency process for satellite (HAP) routed packets. In detail, the satellite 10 transmits the downlink channel to the ground user equipment 22. The user equipment 22 analyzes the received data packet RV0 in order to generate an HARQ acknowledgement command. The HARQ acknowledgement (ACK/NACK) is transmitted to the terrestrial base station 40 in the neighborhood using a terrestrial connection, i.e. by use of terrestrial transceivers. This transmission is done using the terrestrial link marked by the reference numeral U1. Accordingly, the terrestrial base station buffering the redundancy versions RV0, RV1, . . . , transmits the buffered retransmission redundancy versions (RVS) directly to the user equipment 22 (cf. communication link D4) once an NACK (non-acknowledgement command) is received. Due to the short distance between the buffer at the base station 40 and the user equipment 22 requesting a retransmission of an incorrectly transmitted data packet, a low-latency for delivering the redundancy version can be achieved. To sum up, the DL for RV0 is covered by the Satellite 10, while RV1, 2, . . . are covered by a dual connected remote base station 40 which regenerates the RVs 1, 2, 3, . . . from a correctly received RV0 at the remote BS.

According to further embodiments, the terrestrial communication transmission between the user equipment 22 and the base station 40 is used for the uplink, as illustrated by the arrow U2, the uplink channel of the user equipment 22 may be realized via the base station 40, which forwards the uplink data packet UL to the satellite 10 using the communication link U4. This means that the Relay/BS/Buffer node 40 receives (instead of the Satellite-to-Donor-BS) all the UL data of the UE 22 and Acknowledgements; hence, performs the retransmission that may be useful. In detail, the Relay/BS/Buffer node 40 may receive all the UL data if need be to offload same to the satellite/HAP 10 UL capacity. In parallel to the uplink packet UL, the acknowledgment commands and non-acknowledgement commands may be relayed back to the satellite 10 by the base station 40, and then to the network gateway 30 (cf. arrow U3), to satisfy the automatic repeat request ARQ (of the upper layers). Expressed in other words this means that the Relay/BS/Buffer node 40 receives and (optionally) decodes all the Acknowledgement (ACK/NACK) messages from the intended UEs 22 and forwards same.

Also in above embodiments, the concept has been discussed with respect to the transmission of one single data packet DL. However, the concept may also be used for the transmission of a plurality of data packets DLS in the downlink N for the plurality of data packets ULS in the uplink.

Additionally, it should be noted that instead of the one base station 40, a plurality of base stations in the surrounding of the user equipment 22 may be used.

According another embodiment, the following failure handling procedure may be used: If NACK is received at the remote Relay/BS/Buffer 40, a retransmission has to be followed as per timing and retransmission ID sequence. If the Relay/BS/Buffer node 40 failed to generate the correct RV sequence ID, or buffer it (due to channel errors or memory congestion), the Relay/BS/Buffer relays 40 the NACK message again to the satellite/HAP 10 via a dedicated UL, wideband, and high carrier-to-noise-ratio channel. In all cases, ACKs and unattained NACKs (where a retransmission cannot be granted from the Relay/BS/Buffer node 40) may be relayed back to the satellite/HAP 10 via the mentioned dedicated UL, wideband, and high carrier-to-noise-ratio channel. A fall back to legacy transmission where a HARQ acknowledgements are transmitted directly from the UE 22 to the satellite shall be supported as part of the legacy; however, with a very high latency. The remote relay/BS/buffer 40 directly provides the ACKs to the gateway 30 once they are received. If the maximum retransmission counter is expired, a NACK is transmitted to the Gateway 30.

Below, different options, how the data packet RV0 or the redundancy versions RVS can be transmitted from the satellite 20 to the base station 40 and/or generated will be discussed.

The satellite/HAP 10 shall transmit the UE-related downlink signal to the relay/base station/buffer node 20 via a separate channel D3 (with the same or with different wave forms). The relay/base station/buffer node 20 transmits back the signal without decoding or after decoding and encoding if need be, e.g. when wave form changes, to the target UE 22. Here, the initial transmission RV0 and the different redundancy versions (RVS) can be transmitted and buffered in the node memory.

According to a further embodiment, the relay/base station/buffer node 20 shall listen to the same downlink channel as the user equipment 22. Hence, the relay node 20 is responsible for decoding the control information to know the search space and to extract the user equipment grounds with the user equipment ID. Decoding at the remote relay/base station/buffer node can be used if the RVS need to be regenerated or further enhanced signal processing on the user equipment data as may be used.

For the decoding, there are different options: According to an embodiment, the decoder of the relay/base station/buffer node 20 can decode and regenerate the RVS. According to another embodiment, the decoder only decodes and generates the RVS as requested by the system or the user equipment. According to a third embodiment, it can be adaptively switched between the two modes (decoding and decoding on demand).

The below embodiments are based on the assumption, that the relay/base station/buffer 40 listens to the signal sent to the target user equipment by the satellite, so that the base station 40 can decode and generate the different redundancy versions (RVS) based on the initial transmission (DL). According to embodiments, the relay/base station/buffer 40 comprises the decoder which decodes the received transport block (TB) of the intended user equipment 22 from the received RV0 (initial transmission). For security reasons, the user equipment 22 and the associated relay/base station/buffer 40 shares the same key, such that just the relay/base station/buffer 40, where the intended user equipment 22 is associated, is allowed to decode the data packet RV0 (data of the DL shared channel (information)).

According to further embodiments, for every successful decoded frame/transport block of the selected user equipment 22, the relay node 40 shall generate the entire redundancy versions and fill them in a new soft-combining redundancy, e.g., circular, buffered as an LTE (LTE-36.212). If the user equipment 22 is monitored to be either an out of synchronization (or disconnect), the relay may not generate or dump the generated buffer, if the generation was done before. This serves the purpose to save memory.

According to a further embodiment, the relay comprising the memory for buffering, may also be used without a decoder. This simple buffer scenario (no decoding capability of the relay/base station/buffer 40) enables, that the ground node 40 instead shall receive all the RVS that may be used and their IDs, order, and timing, and will buffer them in the memory for each intended user equipment.

The below embodiments are based on the assumption, that the base station 40 receives the redundancy versions sent from the satellite/HAP 10 via a dedicated wideband channel. The dedicated wideband channel has a good C/M due to better antenna matching or aligning when compared to the user equipment. This dedicated wideband channel is used to transmit the RVS (RV0) for decoding if needed (as well as RV1, RV2, . . . ). According to another embodiment, one beam sent by the satellite 10 suffices, if the donor base station may schedule dedicated transmission resolve grounds for the intended UE RV0 and different transmission resource grounds for the relay/base station/buffer 40 RV1, RV2, . . . . The temporary user equipment ID (coupled with the antenna user equipment ID) shall be used to decode the received transport block (together with the RVS).

According to further embodiments, the decision of requesting a redundancy version can be made based on a signal indicative for the received signal quality of the user equipment 22, e.g., a signal describing a channel quality indicator (Cal). The channel quality indicator differs from the NACK/ACK-signal with regard to the analysis of the received signal. This approach enables a predictive (early/preventive) transmission of RVs (base station 40→user equipment 22) based on former CQI feedback about Sat-→user equipment channel, before a NACK is received at the base station 40 from the user equipment 22. This is because the base station 40 or an analyzing entity of same predicts that the transmission quality over the Sat→UE channel will not be sufficient that there is high probability that UE 22 cannot decode the data packet (Sat→UE) error-free.

For determining the channel quality indicator or signal quality indicator, it is sufficient to analyze the non-terrestrial signal received by the user equipment 22. Alternatively, the CQI can be derived from training data as well and not only from data packets. Thus, the analyzing may be performed without decoding the signal. In contrast to this, the NACK/ACK-signal is determined based on the decoded non-terrestrial signal received by the user equipment 22. Note the in above embodiment the CQI may refer to the CQI-Sat→UE-Channel and not to CQI-BS→UE-Channel, wherein the user equipment 22 measures both channel qualities regularly and reports it to base station 40 (CQI-Sat→UE-Channel and CQI-BS→UE-Channel) and to the gateway 30 (CQI-Sat→UE-Channel). Based on the CQI for the BS-to UE-channel) the retransmission rate (cf. U5) may be adapted. In other words, this means that, according to embodiments, the analyzing performed by the user equipment 22 may comprise a decoding or may be performed without decoding of the non-terrestrial signal.

Starting from this, it is another approach, according to another embodiment, not to use the NACK/ACK-signal for deciding on a retransmission. For example, the terrestrial node 40 may comprise an entity analyzing a signal provided by the user equipment 22, e.g., a channel quality indicator provided by the user equipment 22 and determines if the quality falls on a certain threshold to initiate a retransmission of a redundancy version, wherein the transmission of the redundancy version may be performed directly from the terrestrial node, via a terrestrial communication between the node 40 and the user equipment or from the satellite 10 buffering the redundancy version.

The approach using just the CQI or a comparable information has the purpose to save time since the base station 40 immediately forwards at least one RV (e.g. the last RV) to the UE 22. In this case the UE 22 is informed by the base station 40 that the base station 40 operates in this mode in order to be prepared that a RV will be available to enhance decoding even before the UE 22 generates a NACK and sends it to the base station 40.

Figure 3:
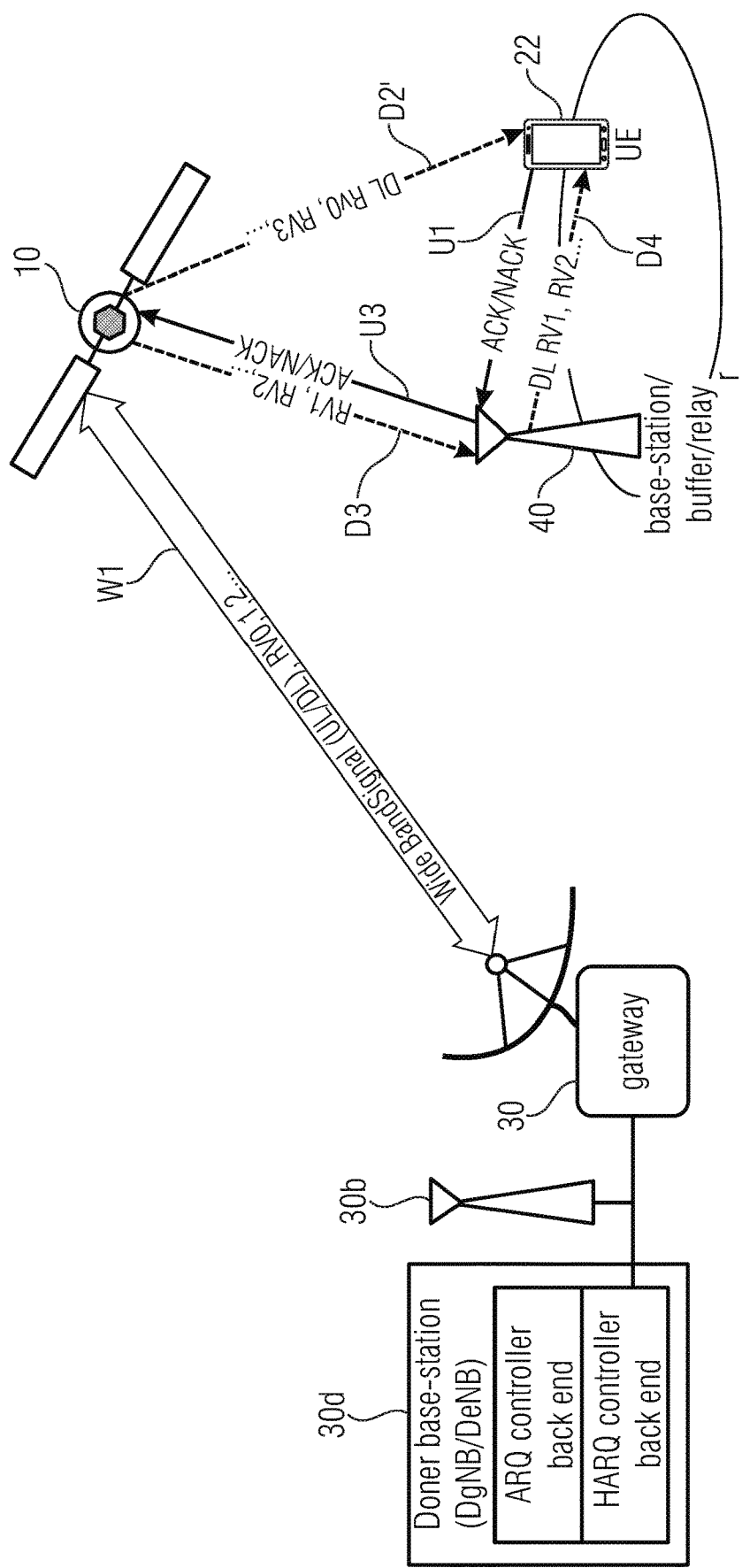
FIG. 3 shows a schematic representation of a configuration comprising a base station, a user equipment, a satellite and a gateway, wherein the HARQ controller is integrated into the base station and the gateway or an entity of the gateway according to further embodiments.

With respect to FIG. 3 another embodiment will be discussed. The configuration of FIG. 3 comprises the gateway 30, the base station 40 which is connected to the gateway via the satellite 10 and arranged in the surrounding of the user equipment 22. The difference with the embodiment of FIG. 2 is, in that the donor base station 30d comprises the HARQ controller (back end) while the base station 40 may also comprise an HARQ controller (front end), e.g. for deciding on a retransmission. This configuration enables, that the RVS can be buffered to the remote relay/base station/buffer 40 or (if needed) to the satellite 20. Therefore, according to embodiments, the satellite 10 may comprise a memory for buffering.

Starting from this configuration, a dual channel operation for the HARQ process (between the relay/base station/buffer node 40 and the satellite 10) may be performed in that way that the RVs are all forwarded by the satellite 10 to the remote relay/BS/buffer 40 with the option to transmit also a few RVs via the satellite/HAPS DL directly to the user equipment 22, as illustrated by the arrow D2'. Thus, according to embodiments, the satellite 10 comprising an internal buffer (not shown), the gateway 30 forwards some or all the RVS onto the satellite internal memory buffer. Hence, the ACKS/NACKS are sent to the terrestrial remote relay/base station/buffer 40 and forwarded by the node 40 back to the satellite 10 in order to reduce the satellite UL traffic and UE power consumption.

The uplink for the rest of information may also be transmitted to the remote relay/buffer/base station 40. The uplink permission shall be: UL shared internal data (information) channel state information (CSI) feedback, UL controlled channel (e.g. buffer status report and scanning request).

According to another embodiment, the gateway 30 buffers one or more RVS (but not all of them) such that the satellite 10 can cover one or more retransmissions without going back to the gateway 30. Hence, acknowledged retransmission or non-acknowledged (e.g., TTI band link) can be supported by the satellite without relay the RVS to the relay/base station/buffer. However, more RVS can still follow (without being buffered at the satellite 10) to be buffered at the relay/base station/buffer 40 and to be used for retransmission based on the sequence and timing, as explained above. As an alternative, a decoding end RVS generating at a relay/base station/buffer 40 can be considered.

As a reliable option, the gateway 30, according to embodiments, buffer at the satellite 10 as well as buffer (or regenerate) all the RVS at the relay/base station/buffer 40. Typically, within all above discussed embodiments the RVS in the buffer are saved until an ACK is received or the maximum number or retransmissions is achieved.

Below, embodiments referring to the aware congestion control and traffic control may be discussed. In case of buffering the redundancy versions at the satellite only (i.e. no ground buffer node), the satellite buffers as much redundancy versions as possible based on the satellite downlink congestion level. In case of buffering the redundancy versions at the ground relay/base station/buffer 40 only, also the buffer at the node 40 can buffer as much redundancy versions as possible based on the terrestrial downlink congestion level. In case of a distributed buffering (partial buffering at the relay 40 and partial buffering at the satellite), different strategies for performing the buffering based on the congestion level on both nodes may be used. For example, a so-called low-balance mode (distributes the retransmission balance) may be used. Here, the redundancy versions RV1, RV3, RVS, RV(k+2) may be buffered to the satellite 10 (k=1, 3, 5, 7, . . . ) while the redundancy versions RV0, RV2, RV4, RV(k+2) may be buffered to the relay/base station/buffer 40 (k=0, 2, 4, 6, . . . ).

According to another embodiment, a so-called timing balancing approach may be used which enables fast retransmission for a limited number of packets. Here, the redundancy versions RV0, RV(n), RV(n+1) are buffered to the satellite or in general shall be buffered at a later time (when n belongs to the maximum retransmission, while the redundancy versions RV1, RV2, RV(n−1) are buffered to the relay/base station/buffer 40 for enabling fast retransmission without the non-terrestrial delay).

A third approach is the so-called optimized/operative mode. This approach maximizes the number of buffered RVS at the ground relay/base station/buffer 40 until the maximum limit (based on the ground station currently computed congestion level L). Afterwards, buffering at the satellite/HAP may be performed (if needed). Instead of a simple buffer fill level=total amount of RVS, L may be referred directly to the maximum possible RV number and signals this to the satellite/HAP 10. E.g. if L=3, the current relay/base station/buffer can guarantee buffering only for buffering RV0, RV1, RV2, RV3 per each data packet. So that, the satellite 10 buffers the redundancy versions RV4, RV5, RV(n).

Figure 4:
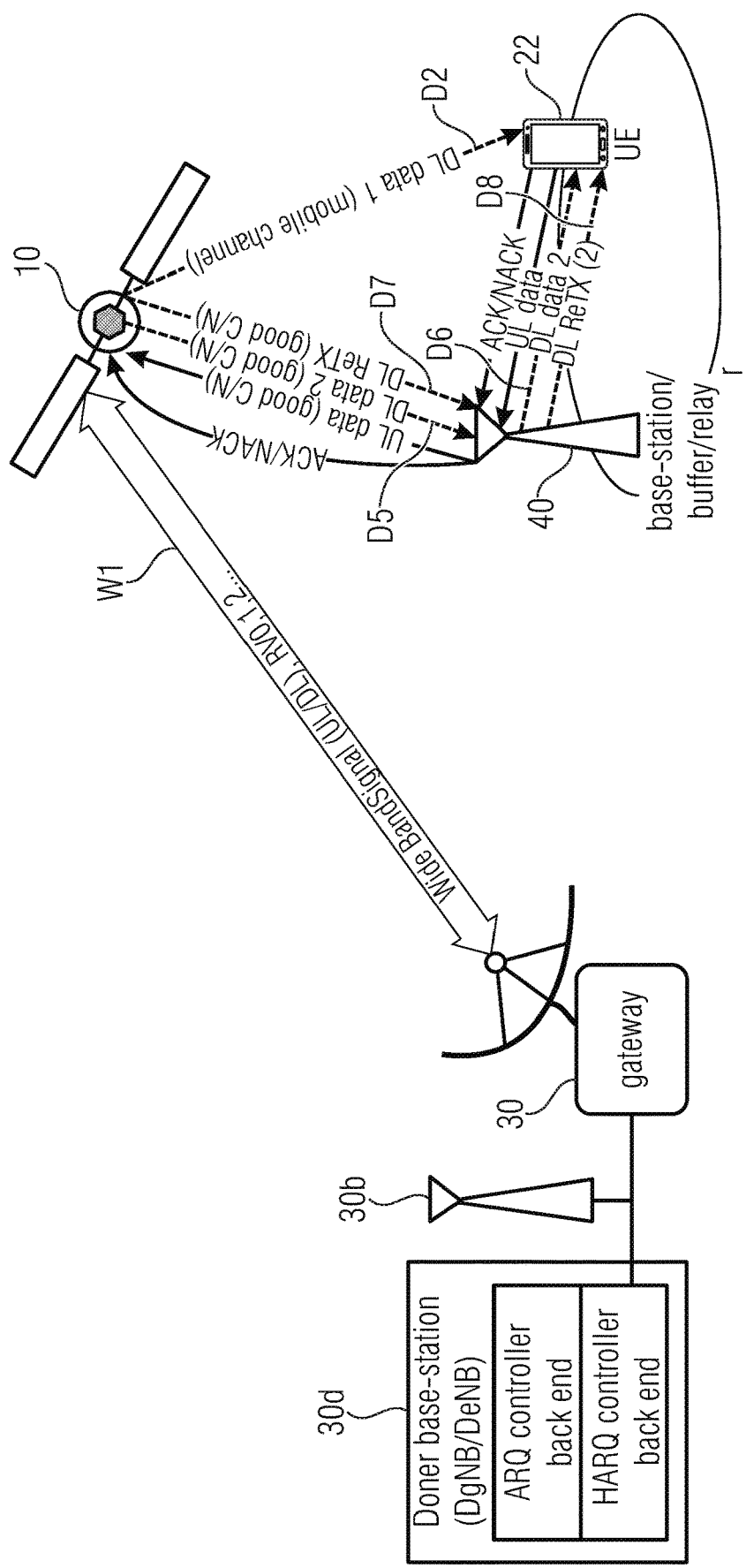
FIG. 4 shows a schematic representation of a configuration comprising a base station, a user equipment, a satellite and a gateway, wherein a satellite user equipment connection via the base station is used for the downlink according to further embodiments.

FIG. 4 shows another configuration of a communication system based on the idea, that the retransmission is covered by the remote relay/base station/buffer 40. Here, more information on downlink is relayed via the remote relay base station 40 in addition to the DL offloading from the non-terrestrial network. As can be seen within the configuration, a first mobile channel from the satellite 10 to the user equipment 22 is used for the downlink (cf. reference numeral D2) together with a second channel for the downlink (cf. reference numeral D5 and D6). This signal is relayed/forwarded using the base station 40 to the user equipment 22. This approach is beneficial, if the gateway 30 band transmission with more capacity than the satellite to user equipment link budget D2. Since the remote relay/base station/buffer has higher carrier-to-noise-ratio link, the remaining data can be relayed by use of same (cf. reference numerals D5 and D6). Here, it should be noted that the transmission D6 is done via a terrestrial communication.

In parallel to the communication comprising the links D5 and D6, signals D7 and D8 comprising retransmission of the initial transmission (reTX) are submitted. Here, data are transmitted from the satellite 10 to the base station 40 via the link D7, wherein the data are forwarded from the base station 40 to the user equipment 22 via the link D8. The HARQ mechanism, the transmission of the ACK/NACK messages as well as the uplink may be realized similar to the system as discussed in context of FIGS. 2 and 3.

Figure 5A:
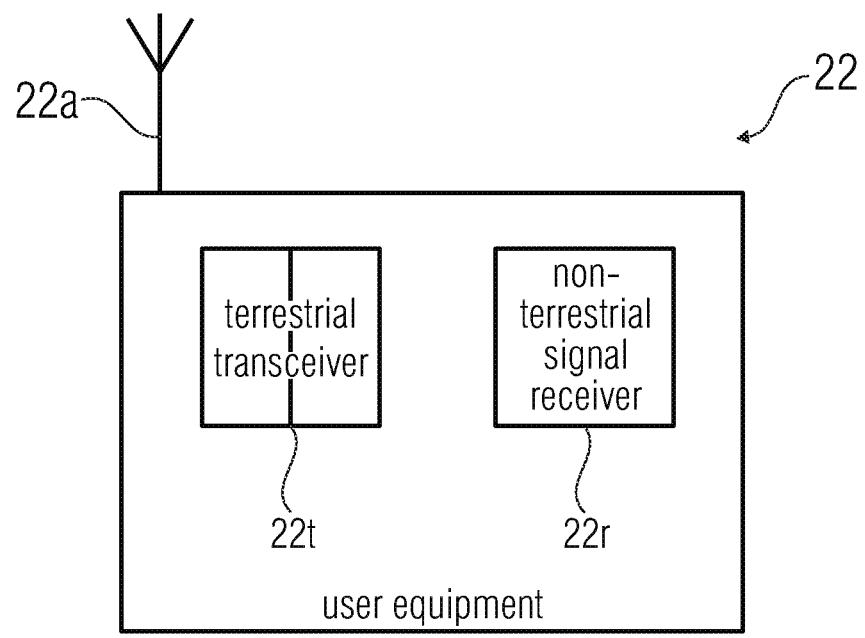
FIGS. 5a to 5c show a schematic representation of components of the system according to embodiments.

For the above described system a user equipment, as will be described below with respect to FIG. 5a, can be used. The user equipment 22, e.g., a smartphone or another mobile device, comprises a non-terrestrial signal receiver 22r which may be, for example, connected to the antenna 22a and configured to receive the non-terrestrial signals, e.g., from a satellite (not shown). Additionally, the user equipment 22 comprises a terrestrial transceiver 22t having an integrated receiver and an integrated transmitter for performing the terrestrial communication to the base station. Therefore, the transceiver is configured to receive and transmit terrestrial signals to the base station (not shown).

Figure 5B:
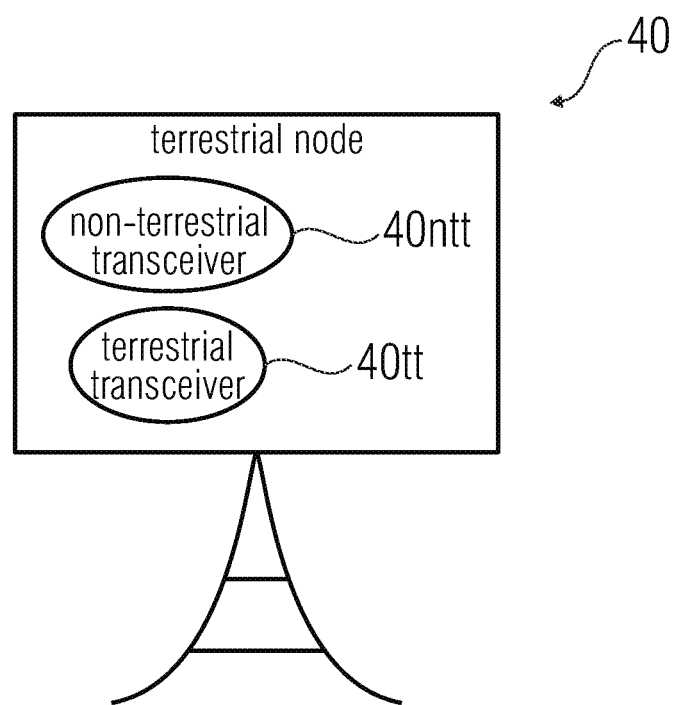

With respect to FIG. 5b an exemplary terrestrial node 40 will be discussed below. In this embodiment the terrestrial node 40 is realized as a base station, wherein it should be noted that such a node can also be realized as user equipment comprising the below discussed transceivers. The terrestrial node 40 comprises a terrestrial transceiver 40tt which is configured to receive and transmit terrestrial signals, wherein a terrestrial signal may be, for example, a radio signal in accordance with one mobile communication standard, like LTE or 5G or NR. Additionally, the terrestrial node 40 comprises a non-terrestrial transceiver which is configured to perform a non-terrestrial communication, e.g., to a satellite or a high altitude platform. This transceiver is marked by the reference numeral 40ntt. According to embodiments, the terrestrial node may be enhanced with regard to its functionality so same can comprise a buffer and/or a controller like an HARQ controller, as discussed above.

Figure 5C:
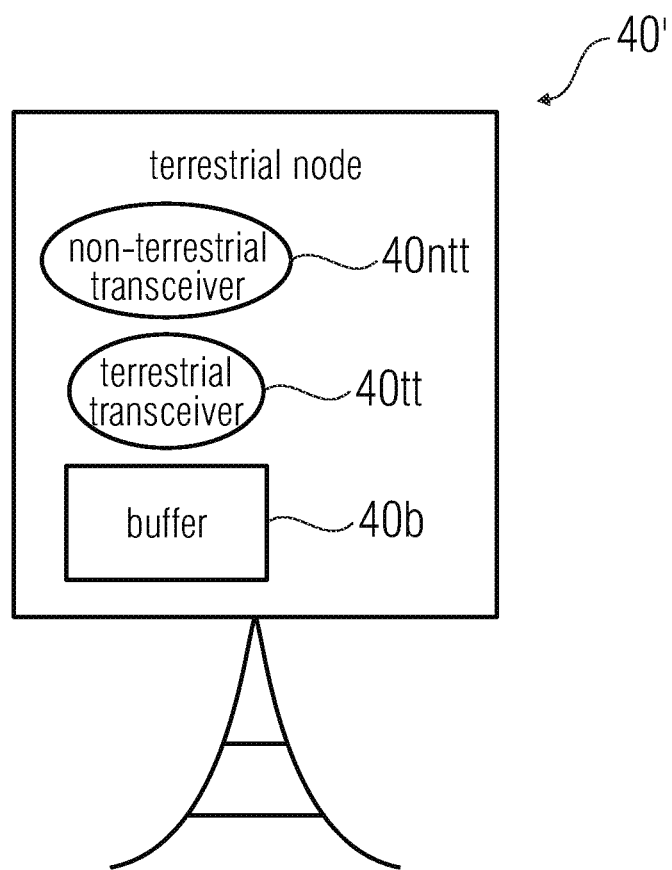

FIG. 5c shows an exemplary terrestrial node 40' comprising the terrestrial transceiver 40tt (terrestrial RX/TX) and the non-terrestrial transceiver 40ntt (non-terrestrial RX/TX) and an additional buffer 40b (also referred to as memory).

With respect to FIG. 6 another embodiment will be discussed. The concept refers to the HARQ process for the uplink and starts from the above described system comprising the gateway 30, the satellite/non-terrestrial node 10, the base station/terrestrial node 14 and the user equipment 22. At the gateway side, the entities 30b and 30d are also arranged. Between the satellite 10 and the gateway 30 the signal W1 comprising the uplink and the downlink is exchanged. It should be noted that W1 does not comprise frame 3 as illustrated by the box showing the transmitted frames. The downlink is forwarded by the satellite using the signal D2. The user equipment 22 itself transmits its uplink U2 to the base station 40 such that same can forward the content of U2 to the gateway 30 via the satellite 10. Therefore, the signal U4, which should comprise the content of U2, is transmitted via the transmission path which is marked by the reference numeral U4. However, as marked by the box showing the transmitted frames, the transmission of frame 3 within U3 failed.

According to the typical HARQ process, this transmission error will be detected by the controller arranged at the donor base station 30d. However, analogously to the above teachings, the base station 40 may comprise an uplink HARQ controller at the front end. This controller analyzes the uplink U2 and transmits, in accordance with the receive signal quality or in accordance with detected transmission errors, an information regarding the signal quality or acknowledgement commands or non-acknowledgement commands. The non-acknowledgement commands enable to initiate the user equipment 22 to retransmit the redundancy version of the broken frame as illustrated by the transmission path U5. This signal U5 is forwarded to the satellite 10 by the base station 40 via the parallel transmission path U6 (parallel means using different resources but simultaneously to U4) and vice versa forwarded to the gateway 30 via the transmission path U7 transmitted in parallel (using different resources, like time or frequency) to U5. Optional features for this embodiment of FIG. 6 will be discussed below.

In order to minimize the RTT from UL HARQ is to optimize the terrestrial network relaying link assuming very low probability of error on the SAT-to-Ground links. The main idea is that:

The terrestrial access node 40 (The Relay/Base-Station) has some intelligence to decode all the UL-0 frames, i.e., transmitted from the UE 22 to the Terrestrial node 40, before relaying them to the Satellite. If a transport-block fails, a negative acknowledgement (NACK) is forwarded to the UE 22 over the control (or data) channel of the terrestrial link to the UE. The terrestrial access node 40 keeps asking for the redundancy versions of the incorrectly decoded frame from the UE 22 until either the RV buffer finishes or the frame is correctly decoded. The RVs are sent as parallel data with either separated resource grants/allocation or a parallel physical channel. Hence, the terrestrial access node 40 relays only the correct data to the satellite 10, keeping the correct sequence frame-number as the original one, however, without the incorrectly decoded ones Once the failed frame is finally decoded during the HARQ process (assuming a maximum retransmission RVs or possibly decoding after at least 1-RV is sent), the terrestrial access node can forward it to the satellite 10 meaning its correct position in the previously relayed data. The correct frame can be transmitted in a dedicated time-frequency resource of the SAT-to-ground links or in a dedicated parallel channel designed for supplementary transmission. If the terrestrial node failed to decode the corrupted frame during the HARQ process, the frame timer expires at the gateway and an ARQ retransmission request is sent over the Satellite DL channel. Here, we assume vulnerable terrestrial transmission channel (i.e., between UE and terrestrial access node) and more accurate Satellite forward and reverse links (SAT-to ground channels).

Figure 6:
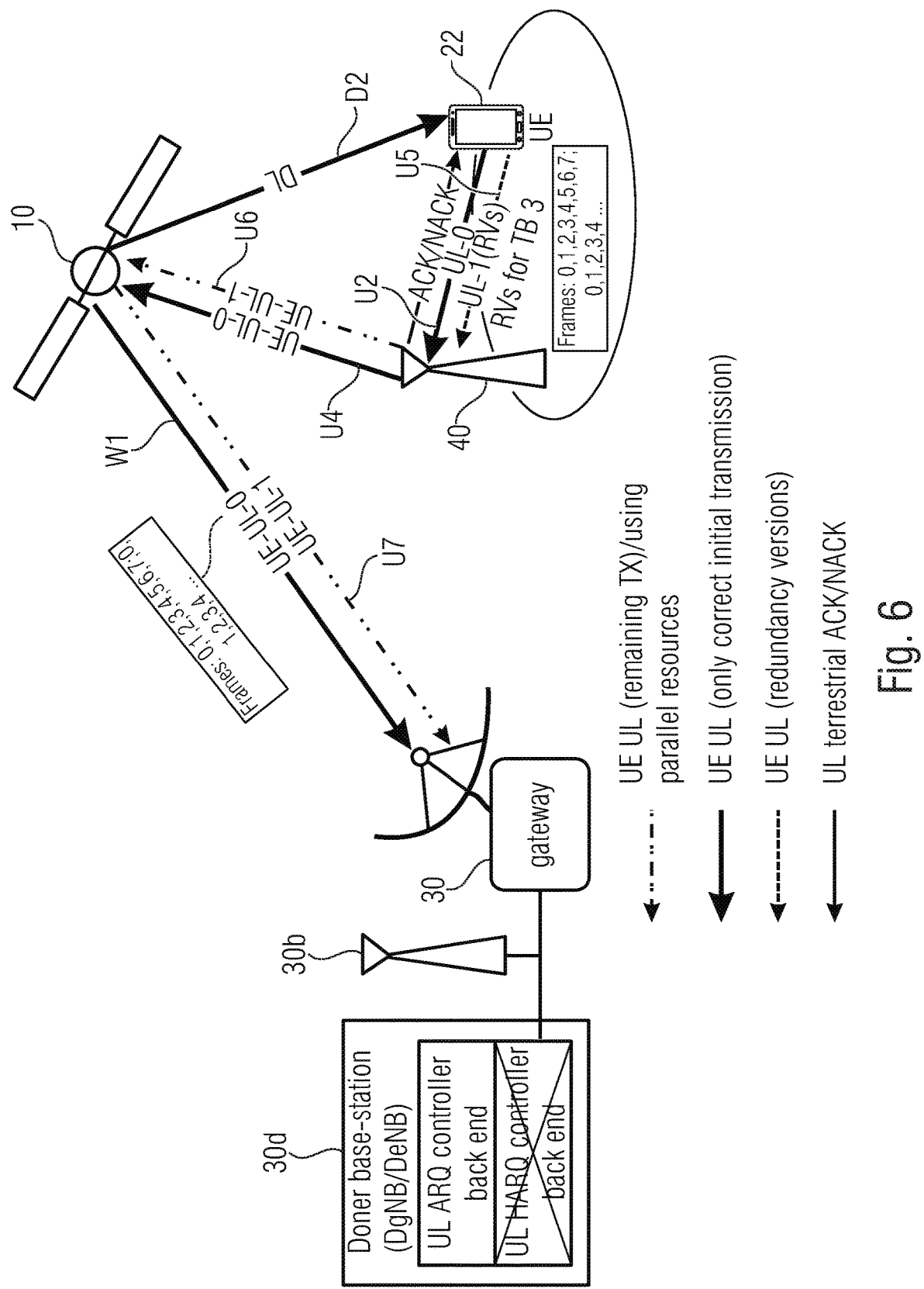
FIG. 6 shows a schematic representation of a system for illustrating an enhanced HARQ process for the uplink.

Coming back to the example of FIG. 6: The UE 22 has an 8 parallel HARQ process, i.e., sliding window of size from 0 to 7. The UE 22 send a sequence of data where transport block 3 fails: 0, 1, 2, 3(E), 4, 5, 6, 7, 0, 1, 2, . . . . The terrestrial access node 40 detects that frame/transport-block 3 fails; hence it keep sending NACKs. The UE 22 sends a parallel retransmission on dedicated resources or channels. The terrestrial access node 40 forward only the correct data in sequence excluding the faulty one (i.e., 3): e.g.: 0, 1, 2, 4, 5, 6, 7, 0, 1, 2, . . . (here 3 fails). Once frame 3 is correctly decoded, the terrestrial node sends it on a dedicated resources (parallel resources) to the SAT with its location in the older data transmission (i.e., between 2 and 4 in a certain frame sequence number). Number 8 applies here.

According to embodiments the encoding scheme used by the base station 40 may be adapted or chosen in accordance to the communication requirements (minimum transmission rate) of the transmission between the user equipment (22) and the terrestrial node (40) and/or in accordance to the communication requirements of the transmission between the terrestrial node (40) and the non-terrestrial node (10).

Figure 7:
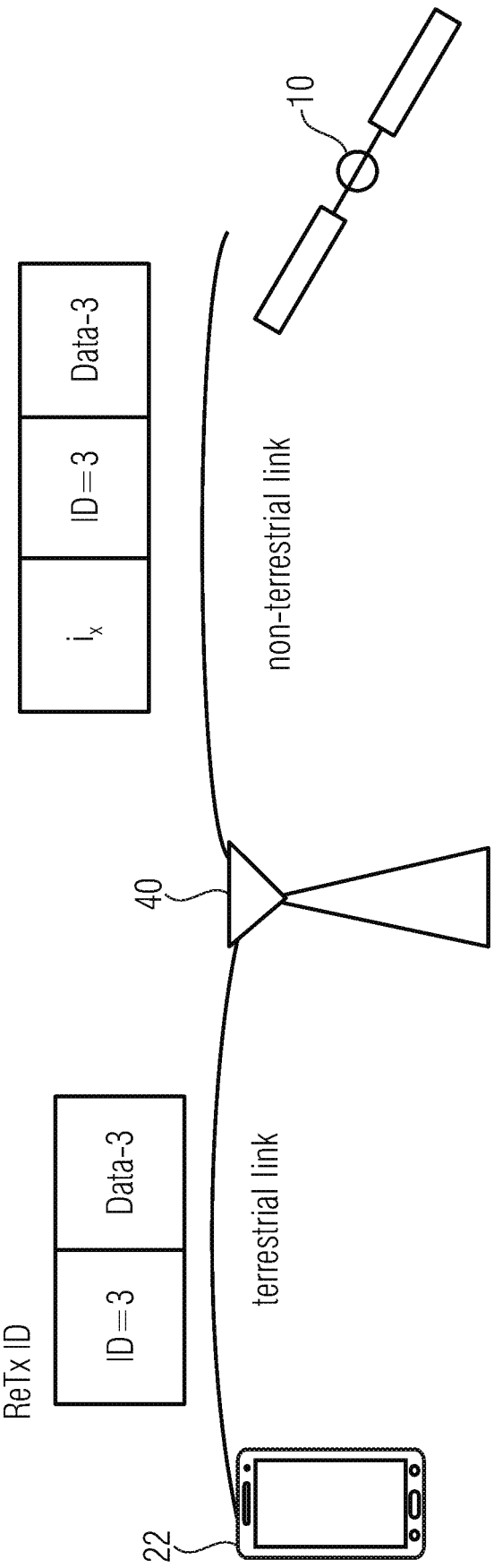
FIG. 7 illustrates the UE-UL-1 Frame/sequence/HARQ-Process with focus on the used Frame Number encapsulation at the terrestrial node.

FIG. 7 shows the used Frame Number encapsulation at the terrestrial node for the UE-UL-1 Frame/sequence/HARQ-Process. ID=3 represents the missing frame and the parallel transmission thereof. For the retransmission of the missing frame an identifier ix is used such that the gateway is enabled to insert the missing frame which is then transmitted in parallel (cf. U6 and U7) correctly in the sequence (cf. Data-3).

In general, the above embodiments enable an ultra-reliable communication with kind of a relatively low latency requirement for isolated ground user equipment. The use case assumes one/or more/suitable terrestrial connection may also be active for uplink/downlink above. The above-described system can switch between the following operation modes.

The Satellite is bent-pipe and the ground node is a simple buffer.

The Satellite is bent-pipe and the ground nodes are intelligent relay or BS buffer.

The satellite can be more intelligent (starting with having a simple IQ buffer up to having full BS capabilities) and the ground node can be either simple or intelligent.

Regarding the embodiment of FIG. 2 it should be noted, that the user equipment 22 can also receive DL data from both, terrestrial 40 and non-terrestrial nodes 10. Moreover, UL can also be routed through the satellite 10 when needed.

With respect to the above embodiments or especially to the embodiment of FIG. 2 it should be noted that the satellite 10 as well as the base station 40 may have the functionality of a relay, which can relay and forward based on one or more of the following options (based on the mode): Amplify-and-forward, decode-and-forward, and quantize-and-forwards. For decode and forward, it could be on the 10-levels or the soft-bit-levels or bit-level. If a bit-level is guaranteed, the RVs regeneration is possible. If a bit-level is guaranteed, a cyclic redundancy check (CRC) can be performed to check the correctness of the received frame/TB. If CRC error is generated, an upper layer NACK (for ARQ) is generated. For example, all the RVs shall be saved until: maximum timer, maximum retransmission, or ACK is granted.

Regarding the HARQ controller it may be noted that same can be realized as distributed controller (distributed between Donor base station 30d (DbNB) and the base station 40) or localized in one of the entities of the system (Donor base station 30d, satellite 10, and the base station 40.

Also the above embodiments have just been discussed with a focus on the user equipment, like a smartphone or another mobile communication device, it should be noted, that the above-described principles may also be used for V2X, V2V, D2D, cellular system, Latency-constrained (mission-critical) communication services, Multilevel QoS services, Narrowband IoT devices, mMTC, ultra-reliable communication, enhanced Multiple access (MA) scheme and MAC channels.

In above embodiments some features have been discussed in combination with other features. However, the combination of the features may be different. Bellow, 16 independent embodiments will be discussed which are marked by the notification E1; E1 (Option 1); E1 (Option 2); E2; E3; E4; E4(S1); E4(S2); E5; E5(S1); E5(S2); E5(S3); E6; E6(S1); E6(S2); E6(S3).

E 1: HARQ optimization to allow low-latency process for Satellite/HAP routed packets:

E1 (p1): Optimize the HARQ routes using a DC- or MC-communication with an existing (nearby) one base-station or more base-stations, respectively. The satellite transmits that DL channel to a ground UE and the UE transmits that HARQ Acknowledgements (ACK/NACK) to the terrestrial BS in the neighborhood. Accordingly, the terrestrial BS transmits the buffered retransmission redundancy versions (RVs) directly to the UE once a NACK is received. However, ACKs are relayed back to the Satellite, then to the network gateway, to satisfy the Automatic Repeat Request (ARQ) of the upper layers.

For Relay, Base-Station, or Buffer node we have the following options:

Option 1: The Satellite/HAP shall transmit the UE-related DL signal to the Relay/Base-Station/Buffer node via a separated channel (with the same or with different waveforms). The Relay/Base-Station/Buffer node transmits back the signal without decoding or after decoding and encoding if need be (e.g., when waveform changes) to the target UE. Inhere, the initial transmission and the different redundancy versions (RVs) can be transmitted and buffered in the node memory.

Option 2: The Relay/Base-Station/Buffer node shall listen to the same downlink channel as the UE itself. Hence, the relay node is responsible for decoding the control information to know the search space and to extract the UE grants with the UE ID. Decoding are the remote relay/Base-Station/Buffer node can be used only if the RVs need to be regenerated or further enhanced signal processing on the UE data may be used.

For Option 2, few choices can be considered:
1. Default, decode and regenerate the RVs
2. Only decode and generate the RVs as requested by the system or the UE
3. Adaptively (between (Option2-1) and on-demand (Option2-2))

E 2: Relay/BS/Buffer node decode and regenerate the redundancy versions:

The Relay/BS/Buffer shall decode the received transport-block (TB) of the intended UE from the received RV0 (initial transmission) based on E1-Option1 or E1-Option2. For security reasons, only the Relay/BS/Buffer where the intended UE is associated is allowed to share the same key to decode the Data of the DL shared channel (information).

For every successfully decoded frame/TB of a selected UE, the relay node shall generate the entire redundancy versions and fill them in a new soft-combining redundancy, e.g., circular, buffer as in LTE [LTE-36.212]. If the UE is monitored to be idle and out of synchronization (or disconnected), the relay may not generate or dump the generated buffer (if generation was done before) in this case to save memory.

In case of simple buffer scenario (no decoding capability at the Relay/BS/Buffer), the ground node instead shall receive all the RVs that may be used and their IDs, order, and timing, and will buffer them in the memory for each intended UE.

E 3: Relay/BS/Buffer node receives (instead of the Satellite-to-Donor-BS) all the UL data and Acknowledgements; hence, performs the retransmission that may be useful.

The Relay/BS/Buffer node shall receive all the UL data of the UE if need be to offload the satellite/HAP UL capacity.

Hence, the Relay/BS/Buffer node receives and decodes all the Acknowledgement (ACK/NACK) messages from the intended UEs.

If NACK is received at the remote Relay/BS/Buffer, a retransmission has to be followed as per timing and retransmission ID sequence.

If the Relay/BS/Buffer node failed to generate the correct RV sequence ID, or buffer it (due to channel errors or memory congestion), the Relay/BS/Buffer relays the NACK message again to the satellite/HAP via a dedicated UL, wideband, and high carrier-to-noise-ratio channel.

In all cases, ACKs and unattained NACKs (where a retransmission cannot be granted from the Relay/BS/Buffer node) have to be relayed back to the satellite/HAP via the mentioned dedicated UL, wideband, and high carrier-to-noise-ratio channel.

A fall back to legacy transmission where a HARQ acknowledgements are transmitted directly from the UE to the satellite shall be supported as part of the legacy; however, with a very high latency.

The remote relay/BS/buffer directly provides the ACKs to the gateway once they are received. If the maximum retransmission counter is expired, a NACK is transmitted to the Gateway.

E 4: transmission methodology for RVs sent from the Satellite/HAP to the Relay/BS/Buffer node Option S1: For E1-Option1: dedicated wideband channel with good C/N and better antenna matching/aligning is used to transmit the RVs (RV0 (for decoding if needed), RV1, RV2, . . . ) from the satellite/HAP to the relay/BS/Buffer node.

Option S2: For E1-Option2: if there is only one beam, the Donor BS may schedule dedicated transmission resource grants for the intended UE RV0 and different transmission resource grants for the Relay/BS/Buffer RV1,2, . . . . The temporary UE-ID (coupled with the intended UE-ID) shall be used to decode the received transport block (together with the RVs).

E 5: Dual channel operation for the HARQ process (between Relay/BS/Buffer node and the Satellite)

Option S1: For a Satellite with an internal buffer, the GW forwards all the RVs onto the Satellite internal memory buffer. Hence, the ACKs/NACKs are sent to the terrestrial remote Relay/BS/Buffer and forwarded from the Node back to the Satellite in order to reduce the satellite UL traffic and UE power consumption. This The uplink for the rest of information is also transmitted to the remote relay/buffer/BS. The uplink information shall be: UL shared channel data (information), channel-state information (CSI) feedback, UL control channel (e.g., buffer-status report and scheduling request).

Option S2: The GW buffers 1 or more RVs (but not all of them) such that the satellite can cover one or more retransmissions without going back to the GW. Hence, acknowledged retransmission or non-acknowledged (e.g., TTI bundling) can be supported by the Satellite without relay the RVs to the Relay/BS/Buffer. However, more RVs can still follow (without being buffered at the Satellite) to be buffered at the Relay/BS/Buffer and to be used for retransmission based on the sequence and timing. As an alternative, a decoding and RVs regeneration at the Relay/BS/Buffer shall be considered in some cases.

Option S3: As a reliable option, the GW can buffer at the Satellite as well as buffering (or regenerating) all the RVs at the Relay/BS/Buffer.

In all cases, S1-3, save the RVs in the buffer until an ACK is received or the maximum number of retransmission is achieved.

E 6: RVs buffering with aware congestion control/traffic control

Option S1: In case of buffering at the Satellite only (i.e., no ground Relay/BS/buffer node), then buffer as much RVs as possible based on the satellite downlink congestion level Option S2: In case of a buffer at the ground Relay/BS/Buffer only, also buffer at the node as much RVs as possible based on the terrestrial downlink congestion level Option S3: In case of distributed buffering (partial buffering at the Relay and partial buffering at Satellite), perform the buffering based on the congestion level on both nodes, e.g.:

Load balance mode (distributes the retransmission balance): e.g.,

RV0, RV2, . . . , RV(k+2)→ to the satellite, k=0, 1, 2, 3, . . . .

RV0, RV2, . . . , RV(k+2)→ to the Relay/BS/Buffer, k=1, 2, 3, . . . .

Time balancing (faster for possibly limited retransmission): e.g.,

RV0, RV(N), RV(N+1)→ N the maximum retransmission; which shall be buffered at a later time RV1, RV2, . . . , RV(N-1)→ to the Relay/BS/Buffer, for fast retransmission without the non-terrestrial delay.

Optimized/cooperative mode: e.g., maximize the number of buffered RVs at the ground relay/BS/buffer until the maximum limit (based on the ground station currently computed congestion level L). Afterwards, buffer at the satellite/HAP if needed. Instead of a simple buffer fill level=total amount of RVs, L may refer directly to the maximum possible RV number and signals this to the satellite/HAP. E.g. if L=3, the ground relay/BS/buffer can guarantee buffering only for buffering RV0, RV1, RV2, and RV3 per each data packet. So the satellite has to buffer RV4, . . . RV(N).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS eNB Evolved Node B (3G base station)
LTE Long-Term Evolution
UE User Equipment (User Terminal)
ACLR Adjacent channel leakage ratio
TDD Time Division Duplex
FDD Frequency Division Duplex
OFDMA Orthogonal Frequency-Division Multiple Access
CQI Channel Quality Information CRC Cyclic Redundancy Check
SPS Semi-persistent Scheduling
DCI Downlink Control Information
UL Uplink
DL Downlink
(s)TTI (short) Transmission Time Interval
PUSCH Physical Uplink Shared Channel
PUCCH Physical Uplink Control Channel
PDSCH Physical Downlink Shared Channel
PDCCH Physical Downlink Control Channel
URLLC Ultra-reliable Low-latency Communications
SR scheduling request
HARQ hybrid automatic repeat request
QoS hybrid automatic repeat request
URLLC ultra-reliable and low latency communications
MCS Modulation coding scheme
MIMO Multiple Input, Multiple output
NTN Non-Terrestrial Network
TN Terrestrial Network
ReTx Retransmission of the initial transmission
TX/RX Transmitter/Receiver

REFERENCES

[LTE-36212] TS 36.212, Evolved Universal Terrestrial Radio Access (E-UTRA); Multiplexing and channel coding
[LTE-36211] TS 36.211, Evolved Universal Terrestrial Radio Access (E-UTRA); Physical channels and modulation
[LTE-36213] Evolved Universal Terrestrial Radio Access (E-UTRA); Physical layer procedures Under change control
[Relay] Aguirre, Miguel A., Introduction to Space Systems Design and Synthesis, Space Technology Library, Springer, 2013
[DC-MC] A. Ravanshid et al., "Multi-connectivity functional architectures in 5G," 2016 IEEE International Conference on Communications Workshops (ICC), Kuala Lumpur, 2016, pp. 187-192.
[Rel11] Rohde & Schwrz, LTE-Advanced (3GPP Rel.11) Technology Introduction, White Paper, 2013

The invention claimed is:

1. A terrestrial node of a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the terrestrial node comprising:
a non-terrestrial signal receiver configured to receive the data packet or a redundancy version of the data packet from the non-terrestrial node;
a memory configured to buffer the data packet or the redundancy version of the data packet;
a terrestrial signal receiver configured to receive the acknowledgement command or the non-acknowledgement command from the user equipment; and
a terrestrial signal transmitter configured to retransmit the data packet or a redundancy version of the data packet to the user equipment as response to the non-acknowledgment command;
wherein the terrestrial node is configured to listen to a data signal from the non-terrestrial node in order to receive the data packet sent to the user equipment;
wherein the terrestrial node comprises a decoder which is configured to decode the data packet in order to generate at least one redundancy version of the data packet; and wherein the decoder performs the decoding and generating the redundancy versions for each data packet received by the satellite signal receiver independent on a request.

2. The terrestrial node according to claim 1, wherein the terrestrial node is configured to forward another data packet received from the user equipment to the non-terrestrial node.

3. The terrestrial node according to claim 1, wherein the HARQ controller is integrated into the terrestrial node and configured to decode the acknowledgement command and the non-acknowledgment command and to control the retransmission.

4. The terrestrial node according to claim 1, wherein the terrestrial node is configured to forward the acknowledgement command or the non-acknowledgement command to the gateway via the satellite.

5. The terrestrial node according to claim 1, wherein the decoder is configured to decode and generate data packets on request.

6. The terrestrial node according to claim 1, wherein the decoder is configured to receive an information from the user equipment regarding the reception signal quality and to suppress the decoding and generating, when the reception signal quality is marked as idle or when non.

7. The terrestrial node according to claim 1, wherein the decoder is configured to decode the data packet, when the user equipment is associated with the terrestrial node, and to suppress the decoding, in case the user equipment is not associated with the terrestrial node.

8. The terrestrial node according to claim 1, wherein the terrestrial node is configured to receive the data packet or a redundancy version of the data packet via a separate channel from the non-terrestrial node.

9. A method for operating a terrestrial node a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method comprises the following steps:
- listening to a data signal from the non-terrestrial node in order to receive the data packet sent to the user equipment;
- receiving the data packet or a redundancy version of the data packet from the non-terrestrial node using a non-terrestrial signal receiver;
- buffering the data packet or the redundancy version of the data packet using a memory;
- receiving the acknowledgment command or the non-acknowledgment command from the user equipment using the terrestrial signal receiver; and
- retransmitting the buffered data packet or the buffered redundancy version of the data packet to the user equipment using a terrestrial transceiver as response to the non-acknowledgment command;
- decoding the data packet in order to generate at least one redundancy version of the data packet; and performing the decoding and generating the redundancy versions for each data packet received by the satellite signal receiver independent on a request.

10. A system comprising a gateway, a non-terrestrial node, a terrestrial node and at least a user equipment, wherein terrestrial node is formed according to claim 1.

11. The satellite according to claim 10, wherein the one or more transmitters are configured to transmit the data packet or the redundancy version of the data packet to the terrestrial node using dedicated wide band channel.

12. The satellite according to claim 10, wherein the HARQ controller is integrated into the gateway and controls the transmitter of the satellite, wherein the transmitter of the satellite is controlled by the gateway which assigns different resources for transmitting the data packet to the user equipment and for transmitting the data packet or the redundancy version of the data packet to the terrestrial node.

13. The satellite according to claim 10, wherein the transmitter of the satellite is controlled by the gateway which assigns different resources for transmitting the data packet to the user equipment and for transmitting the data packet or the redundancy version of the data packet to the terrestrial node.

14. A satellite of a system, the system comprising a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node,
the satellite comprising: a memory which is configured to buffer the data packet to be sent to the user equipment or a redundancy version of the data packet;
wherein the satellite is configured to forward the data packet or a redundancy version of the data packet to the terrestrial node in order to buffer same at the terrestrial node; and wherein the forwarded redundancy versions of the data packet are different redundancy versions when compared to the redundancy versions buffered by the memory of the satellite.

15. The satellite according to claim 14, wherein the HARQ controller is integrated into the gateway or the terrestrial node and configured to control the buffering of the redundancy versions performed by the satellite or the terrestrial node.

16. A method for operating a satellite or system, the system comprising a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method comprises the following steps:
- buffering the data packet or a redundancy version of the data packet by a memory of the satellite; or
- forwarding the data packet or the redundancy version of the data packet to a terrestrial node, such that the terrestrial node buffers the data packet or the redundancy version of the data packet;
- forwarding the data packet or a redundancy version of the data packet to the terrestrial node in order to buffer same at the terrestrial node; and wherein the forwarded redundancy versions of the data packet are different redundancy versions when compared to the redundancy versions buffered by the memory of the satellite.

17. A non-transitory digital storage medium having a computer program stored thereon to perform the method for operating a terrestrial node of a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method comprises the following steps:
- listening to a data signal from the non-terrestrial node in order to receive the data packet sent to the user equipment;

receiving the data packet or a redundancy version of the data packet from the non-terrestrial node using a non-terrestrial signal receiver;
buffering the data packet or the redundancy version of the data packet using a memory;
receiving the acknowledgment command and/or the non-acknowledgment command from the user equipment using the terrestrial signal receiver; and
retransmitting the buffered data packet or the buffered redundancy version of the data packet to the user equipment using a terrestrial transceiver as response to the non-acknowledgment command,
decoding the data packet in order to generate at least one redundancy version of the data packet; and performing the decoding and generating the redundancy versions for each data packet received by the satellite signal receiver independent on a request,
when said computer program is run by a computer.

18. A non-transitory digital storage medium having a computer program stored thereon to perform the method for operating a satellite or system, the system comprising a gateway, a non-terrestrial node, a terrestrial node and at least a user equipment as well as a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the method comprises the following steps:
buffering the data packet or a redundancy version of the data packet by a memory of the satellite; or
forwarding the data packet or the redundancy version of the data packet to a terrestrial node, such that the terrestrial node buffers the data packet or the redundancy version of the data packet;
forwarding the data packet or a redundancy version of the data packet to the terrestrial node in order to buffer same at the terrestrial node; and wherein the forwarded redundancy versions of the data packet are different redundancy versions when compared to the redundancy versions buffered by the memory of the satellite
when said computer program is run by a computer.

19. A terrestrial node of a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment via a non-terrestrial channel, wherein the user equipment is configured to analyze a channel quality of the non-terrestrial channel and to transmit an information regarding the channel quality of the non-terrestrial channel to the base station, the terrestrial node comprising:

a non-terrestrial signal receiver configured to receive the data packet or a redundancy version of the data packet from the non-terrestrial node;
a memory configured to buffer the data packet or the redundancy version of the data packet;
a terrestrial signal receiver configured to receive the information regarding the channel quality of the non-terrestrial channel from the user equipment; and
a terrestrial signal transmitter configured to retransmit the data packet or a redundancy version of the data packet to the user equipment as response to a channel quality of the non-terrestrial channel below a threshold;
wherein the terrestrial node is configured to listen to a data signal from the non-terrestrial node in order to receive the data packet sent to the user equipment;
wherein the terrestrial node comprises a decoder which is configured to decode the data packet in order to generate at least one redundancy version of the data packet; and wherein the decoder performs the decoding and generating the redundancy versions for each data packet received by the satellite signal receiver independent on a request.

20. A method for operating a terrestrial node a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment via a non-terrestrial channel, wherein the user equipment is configured to analyze a channel quality of the non-terrestrial channel and to transmit an information regarding the channel quality of the non-terrestrial channel to the base station, the method comprises the following steps:
listening to a data signal from the non-terrestrial node in order to receive the data packet sent to the user equipment;
receiving the data packet or a redundancy version of the data packet from the non-terrestrial node using a non-terrestrial signal receiver;
buffering the data packet or the redundancy version of the data packet using a memory;
receiving the information regarding the channel quality of the non-terrestrial channel from the user equipment using the terrestrial signal receiver; and
retransmitting the buffer data packet or the buffered redundancy version of the data packet to the user equipment using a terrestrial transceiver as response to a channel quality of the non-terrestrial channel below a threshold;
decoding the data packet in order to generate at least one redundancy version of the data packet; and performing the decoding and generating the redundancy versions for each data packet received by the satellite signal receiver independent on a request.

21. A terrestrial node of a system, the system comprising a gateway, a non-terrestrial node, a terrestrial node and at least a user equipment, wherein terrestrial node comprises a HARQ controller, wherein the gateway is configured to forward a data packet, said data packet to be transmitted to the user equipment, to the non-terrestrial node, wherein the non-terrestrial node is configured to forward the received data packet to the user equipment using a signal, wherein the user equipment is configured to analyze the received data packet with regard to a transmission error or to analyze the signal from the non-terrestrial node with regard to a signal quality and to generate a negative acknowledgment command or an acknowledgement command dependent on the transmission error or to generate another signal indicating the reception signal quality dependent on the reception signal quality, wherein the user equipment is configured to transmit the acknowledgement command and the non-acknowledgement command or the other signal to the terrestrial node which communicates with the non-terrestrial node, the terrestrial node, the terrestrial node comprising:
- a non-terrestrial signal receiver configured to receive the data packet or a redundancy version of the data packet from the non-terrestrial node;
- a memory configured to buffer the data packet or the redundancy version of the data packet;
- a terrestrial signal receiver configured to receive the acknowledgement command or the non-acknowledgement command from the user equipment; and
- a terrestrial signal transmitter configured to retransmit the data packet or a redundancy version of the data packet to the user equipment as response to the non-acknowledgment command;
- wherein the terrestrial node is configured to listen to a data signal from the non-terrestrial node in order to receive the data packet sent to the user equipment;
- wherein the terrestrial node comprises a decoder which is configured to decode the data packet in order to generate at least one redundancy version of the data packet; and wherein the decoder performs the decoding and generating the redundancy versions for each data packet received by the satellite signal receiver independent on a request.

* * * * *